(12) United States Patent
Lah

(10) Patent No.: US 6,964,727 B2
(45) Date of Patent: *Nov. 15, 2005

(54) COKE DRUM BOTTOM DE-HEADING SYSTEM

(75) Inventor: Ruben F. Lah, West Jordan, UT (US)

(73) Assignee: Curtiss-Wright Flow Control Corporation, Roseland, NJ (US)

( * ) Notice: Subject to any disclaimer, the term of this patent is extended or adjusted under 35 U.S.C. 154(b) by 38 days.

This patent is subject to a terminal disclaimer.

(21) Appl. No.: 10/442,673

(22) Filed: May 20, 2003

(65) Prior Publication Data

US 2004/0065537 A1 Apr. 8, 2004

Related U.S. Application Data

(63) Continuation-in-part of application No. 09/946,917, filed on Sep. 5, 2001, now Pat. No. 6,565,714.
(60) Provisional application No. 60/275,527, filed on Mar. 12, 2001.

(51) Int. Cl.$^7$ .................. C10B 25/00; C10B 25/02; C10B 25/04; C10B 25/08; C10B 25/20
(52) U.S. Cl. ............ 202/244; 202/242; 202/244; 202/245; 202/252; 202/262; 49/149; 49/152; 49/453
(58) Field of Search ................. 202/105, 120, 202/217, 221, 222, 239, 242, 244, 245, 252, 262, 270; 49/453, 149, 152

(56) References Cited

U.S. PATENT DOCUMENTS

| | | | |
|---|---|---|---|
| 2,317,566 A | 4/1943 | Utterback | 202/96 |
| 2,761,160 A | 9/1956 | Manning | 15/104.07 |
| 3,379,623 A | 4/1968 | Forsyth | 202/252 |
| 4,626,320 A | 12/1986 | Alworth et al. | 201/2 |
| 4,960,358 A | 10/1990 | DiGiacomo et al. | 414/684.3 |
| 5,048,876 A | 9/1991 | Wallskog | 285/364 |
| 5,228,825 A | 7/1993 | Fruchtbaum et al. | 414/684.3 |
| H1442 H | 6/1995 | Edgerton et al. | 196/125 |
| 5,785,843 A | 7/1998 | Antalffy et al. | 208/131 |
| 5,876,568 A | 3/1999 | Kindersley | 202/242 |
| 6,039,844 A | 3/2000 | Malik | 202/227 |
| 6,066,237 A | 5/2000 | Kindersley | 202/242 |
| 6,113,745 A | 9/2000 | Maitland et al. | 202/262 |
| 6,223,925 B1 | 5/2001 | Malsbury et al. | 220/328 |
| 6,228,225 B1 | 5/2001 | Meher-Homji | 202/250 |

(Continued)

*Primary Examiner*—Alexa Doroshenk
(74) *Attorney, Agent, or Firm*—Kirton & McConkie; Michael F. Krieger

(57) ABSTRACT

The present invention features a coke drum de-heading system comprising (a) at least one coke drum having an orifice therein; (b) a de-header valve removably coupled to the coke drum designed to de-head the coke drum; and (c) an exchange system, including an upper and lower bonnet and other elements and members adapted to integrate the de-heading system, and particularly the de-header valve, into the manufacturing system. The de-header valve itself comprises (1) a main body having an orifice dimensioned to align with and couple to, in a concentric relationship, the orifice of the coke drum; (2) a live loaded seat assembly coupled to the main body and comprising a dynamic, live loaded seat, a live seat adjustment mechanism coupled to the main body and designed to control and adjust the force and resulting seat load of the dynamic, live loaded seat, and a force transfer module in juxtaposition to the dynamic, live loaded seat for transferring the force from the live loaded seat adjustment mechanism to the dynamic, live loaded seat; (3) a static seat positioned opposite from and counteracting or counterbalancing the dynamic, live loaded seat; and (4) a blind or sliding blind capable moving in a linear, bi-directional manner within the de-header valve and between the dynamic, live loaded seat and the static seat, such that upon actuation of the blind from a closed position to an open position, the coke drum is de-headed.

37 Claims, 14 Drawing Sheets

U.S. PATENT DOCUMENTS

| | | | |
|---|---|---|---|
| 6,254,733 B1 | 7/2001 | Lu et al. | 202/245 |
| 6,264,797 B1 | 7/2001 | Schroeder et al. | 201/39 |
| 6,264,829 B1 | 7/2001 | Antalffy et al. | 208/131 |
| 6,565,714 B2 * | 5/2003 | Lah | 202/245 |
| 6,660,131 B2 * | 12/2003 | Lah | 202/245 |
| 2004/0118746 A1 * | 6/2004 | Wilborn et al. | 208/131 |

* cited by examiner

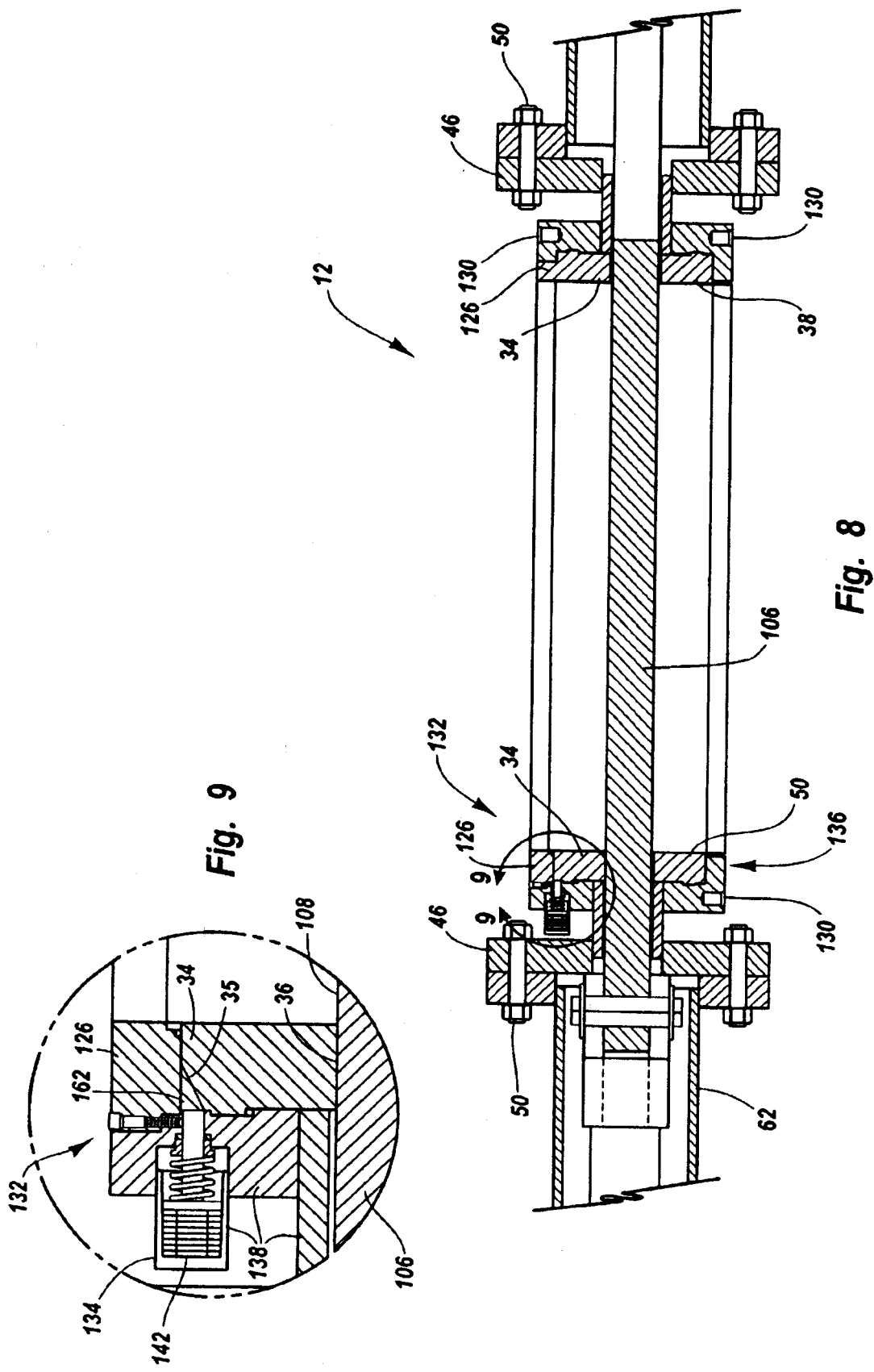

COKE DRUM BOTTOM DE-HEADING SYSTEM

RELATED APPLICATIONS

Is a continuation-in-part application of U.S. patent application Ser. No. 09/946,917, filed Sep. 5, 2001, now U.S. Pat. No. 6,565,714, which claims priority to U.S. patent application Ser. No. 60/275,527 filed on Mar. 12, 2001.

BACKGROUND

1. Field of the Invention

The present invention relates to a system and device for de-heading a vessel containing a fluid, distillates, or unconsolidated debris byproduct, such as the several types of coke. Specifically, the present invention relates to a system and device, namely a de-header valve, that is coupled to a coke drum, particularly at the top or bottom, which serves to safely and effectively de-head the coke drum following the manufacture of coke, or other byproducts, and to facilitate the removal of coke during the decoking process.

2. Background

In the hydrocarbon processing industry, many refineries recover valuable products from the heavy residual oil that remains after refining operations are completed. This recovery process is known as delayed coking and produces valuable distillates and coke in large vessels or coke drums. Coke drums are usually in operation in pairs so that when one coke drum is being filled with the byproduct or residual material, the feed may be directed to an empty drum so that the filled drum may be cooled and the byproduct purged from the coke drum, a process known as decoking. This allows the refinery process to operate in a continuous manner, without undue interruption.

When one coke drum is full, it must be purged of the byproduct fed into it. The drum is steam purged and cooled with quench water. The drum is then drained of water and vented to atmospheric pressure, after which the top and bottom heads are removed (i.e. the coke drum is de-headed) to allow the coke to be cut from the drum and fall into a catch basin, typically a rail car. This process of de-heading the coke drum can be extremely dangerous for several reasons. To mention only a few, the cooling water introduced into the hot drums prior to the removal of the bottom head becomes extremely hot and could leak from the loosened head and scald surrounding operators, the load of un-drained water and loose coke within the drum may exceed the limits of the support system and cause heavy equipment to fall, positioning the chute and necessary removal of the flanges or heads is done with operators who are in close proximity to the drums, potentially falling coke may injure workers as the heads are removed, and operating personnel may be exposed to finely divided coke particles, steam, hot water and noxious gases, when the drum is opened. Indeed several fatalities occur each year as a result of this manufacturing process. Once the coke is removed, the heads are replaced and the coke drum is prepared to repeat the cycle.

Prior art systems and methods have tired to more efficiently and effectively de-head coke drums, as well as to minimize many of the dangers inherent is the de-heading process. One such method involves placing a de-heading cart under the drum, raising a flange support ram, with braces installed, and loosening some (up to one half) of the flange bolts by manual operation with an impact wrench. Following the water quench and drain, the remaining bolts are manually removed, braces are removed from the ram, the approximately 4-ton flange is lowered, and the cart, with flange resting thereon, is moved away. This is extremely dangerous due to the manual labor requirements.

Other systems have been disclosed, which somewhat reduce human or manual involvement. For example, U.S. Pat. No. 4,726,109 to Malsbury et al. and U.S. Pat. No. 4,960,358 to DiGiacomo et al. describe a remote unheading device for coking drums. The device includes a head unit for attachment to a lower flange of a coking drum and a plurality of swing bolts which are disconnected by remotely operated de-tensioning equipment. A platform device lowers the head unit, moves it laterally to one side and tips it for cleaning. A chute attached to the frame can be raised into engagement with the coking drum lower flange for removal of coke from the drum.

U.S. Pat. No. 5,098,524 to Antalfy et al. filed on Dec. 10, 1990 discloses a coke drum unheading device having a pivoting actuator system operable from a location remote from a drum outlet. The actuator is adapted to move a drum head between closed and open positions and to retain the drum head in a closed position under a load.

U.S. Pat. No. 5,500,094 to Fruchtbaum provides a coke drum unheading device that retracts and tilts the bottom head incrementally so that falling debris such as shot coke can be caught by a chute. Following disposal of the loose debris, the head can be withdrawn from the area of the drum for maintenance. Specifically, the invention provides an unheading device for removing a bottom head from a flange on a lower end of a coke drum. An unheading car is horizontally movable into and from position below the bottom head. A vertically adjustable bottom head support member is mounted on the car. A bearing plate is pivotally mounted at an upper end of the support member for engaging a lower surface of the bottom head. A retractable arm has first and second sections hingedly connected at one end and having respective opposite ends secured to the bearing plate and the support member for pivoting the bearing plate and bottom head supported thereon with respect to horizontal, preferably to tilt the head towards an adjacent chute.

U.S. Pat. No. 5,581,864 to Rabet discloses an apparatus and method enabling removal of the drum head of a coke drum, which comprises an apparatus remotely placing a carriage under the drum head and the carriage is adapted to remotely engage the drum head, tightly support the head against the drum while workers are in the area, and to lower the head and carry it away. A safety feature is also included and disclosed, wherein the carriage is normally supported by springs which, in the event of excessive loads, automatically transfers the load carrier to an overhead beam designed to carry any excessive loads.

Each of these prior art devices share common deficiencies in that they are incapable of providing simple, efficient, and safe solutions to the de-heading of a coke drum. Specifically, each of the assemblies or devices require that the head unit be completely removed from the flange portion of the coke drum after each coking cycle and prior to the purging of the coke from the coke drum. This creates an extreme hazard to workers and provides an inefficient and time consuming procedure. Removal of the head unit increases the chance for accident, while at the same time increases human involvement as the head unit must be properly placed on the coke drum each time despite the automation involved. In addition, a large amount of floor space is required to accommodate those assemblies and devices that automate the removal and lifting of the head unit from the coke drum. Finally, such devices and systems may not be operable in an environment where there the bottom headroom is less than the diameter of the bottom head.

SUMMARY AND OBJECTS OF THE INVENTION

In light of the problems and deficiencies inherent in prior art coke drum deheading systems and devices, the present invention seeks to provide a more efficient, cost-effective, and safe coke drum de-heading device and system.

Therefore, it is an object of the preferred embodiments of the present invention to provide a simplified and reliable coke drum de-heading system that does not require the physical removal of the coke drum heads after each coking cycle, but rather comprises a mechanical de-header valve that accomplishes the equivalent de-heading function of prior art designs.

It is another object of the preferred embodiments of the present invention to provide a coke drum de-heading system, wherein the de-header valve is removably coupled to the flanged portion of a coke drum and adapted to de-head the coke drum without having to be removed after each coking cycle.

It is still another object of the preferred embodiments of the present invention to provide a coke drum de-heading system having a dual seated, linear motion blind.

It is a further object of the preferred embodiments of the present invention to provide a coke drum de-heading system having a linear motion blind as the only major moving part.

It is still a further object of the preferred embodiments of the present invention to provide a coke drum de-heading system that connects to the coke drum via a flanged bolted connection.

It is still a further object of the preferred embodiments of the present invention to provide a coke drum de-heading system having dual independent seats that provide double block and bleed and double block and purge capabilities.

It is still a further object of the preferred embodiments of the present invention to provide a coke drum de-heading system having metal to metal seating.

A still further object of the preferred embodiments of the present invention is to provide one or more dynamic or live loaded seats energized from outside the process stream.

A still further object of the preferred embodiments of the present invention is to provide a system design having remote verification of positive isolation.

A still further object of the preferred embodiments of the present invention is to provide a system having instant and remote live switching to double block and vent mode from double block and purge mode upon loss of purge steam.

To achieve the foregoing objects, and in accordance with the invention as embodied and broadly described herein, the present invention features a coke drum de-heading system that provides unique advantages over prior art de-heading systems, namely the de-heading of a coke drum without having to physically remove the head units. This is essentially accomplished using a specially designed de-header valve to be used in a de-header system.

Specifically, the de-header system comprises a dual seated, linear motion goggle blind gate valve, or de-header valve, that is removably coupled to and seals against the flanged portion of a coke drum much the same way a conventional head unit would be attached. The de-header valve is equipped with a sliding blind having an orifice therein, a flat surface adjacent the orifice, a stroke slightly greater than the diameter of the orifice in the de-header valve, and upper and lower seats, wherein one of such seats is a dynamic, live loaded seat that is capable of adjustment so as to seal the blind between the upper and lower seats. As such, the sliding blind can be moved in a substantially linear bi-directional manner between upper and lower seats, or dual seats, thus causing the orifice located thereon to move between an open, closed, and partially open position relative to the orifice in the coke drum. In a closed position, the de-header valve and coke drum are prepared to receive the byproduct feed from the refinery process used to manufacture coke. Once the drum is full, the valve may be actuated causing the sliding blind to open. In doing so, coke that has accumulated on the blind is sheared by the upper and lower seats, thus de-heading the coke drum and facilitating the removal of coke using methods commonly known in the art. The critical aspect of the present invention is its ability to provide a simple, yet effective de-heading system comprising a de-header valve having a sliding blind that moves back and forth between dual independent seats to de-head a coke drum and simplify the decoking process. Another critical aspect of the present invention is the ability to de-head the coke drum without having to remove the head unit, and to do so at a remote location with little or no manual requirements.

In a preferred embodiment, the present invention features a coke drum de-heading system comprising (a) at least one coke drum containing manufactured coke therein, wherein the coke drum has a top orifice and a bottom orifice; (b) a de-header valve removably coupled to the coke drum and designed to facilitate the removal of coke from the coke drum by de-heading the coke drum and allowing the coke to pass there through; and (c) an exchange system, including an upper and lower bonnet and other elements and members adapted to integrate the de-heading system, and particularly the de-header valve, into the manufacturing system. The de-header valve itself comprises (1) a main body having an orifice dimensioned to align, in a concentric relationship, with either the top or bottom orifice of the coke drum when the de-header valve is coupled thereto; (2) a live loaded seat assembly coupled to the main body and comprising a dynamic, live loaded seat, a live seat adjustment mechanism coupled to the main body and designed to control and adjust the force and resulting seat load of the dynamic, live loaded seat, and a force transfer module in juxtaposition to the dynamic, live loaded seat for transferring the force from the live loaded seat adjustment mechanism to the dynamic, live loaded seat; (3) a static seat positioned opposite from and counteracting or counterbalancing the dynamic, live loaded seat; and (4) a blind or sliding blind capable moving in a linear, bi-directional manner within the de-header valve and between the dynamic, live loaded seat and the static seat, the blind physically controlled by an actuator and having a force exerted thereon by the dual seats, namely the dynamic, live loaded seat and the static seat, such that a seal is created between the dynamic, live loaded seat, the blind, and the static seat. In essence, the de-header valve de-heads the coke drum and facilitates the removal of the coke from the coke drum upon actuation of the blind from a closed to an open position wherein the coke is sheared.

The present invention further comprises a point to point sealing system comprising a plurality of loaded, independent, dual seats, preferably four, that seal directly against the gate. The seal consists of or is a result of the metal to metal seating between the upper and lower seats and the blind. Due to a dynamic, loaded upper seat, the amount of force required to properly seal the seats to the gate is accomplished using a live load seat adjustment mechanism designed to control the amount of force exerted on the blind.

As a result, the present invention provides a new and improved coke drum de-heading system. The system also utilizes pressure valves and steam purge inlet valves, as well as emergency vent valves to monitor and control pressure within the system and to prevent inadvertent venting of the steam to atmosphere.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIG. 8 illustrates the workings of the live or dynamically loaded seat concept and its relation to the sliding blind according to the present invention;

FIG. 9 illustrates a detailed view of the dynamic, live loaded seat and the live seat adjustment mechanism;

DETAILED DESCRIPTION OF THE PREFERRED EMBODIMENTS

Figure 1:
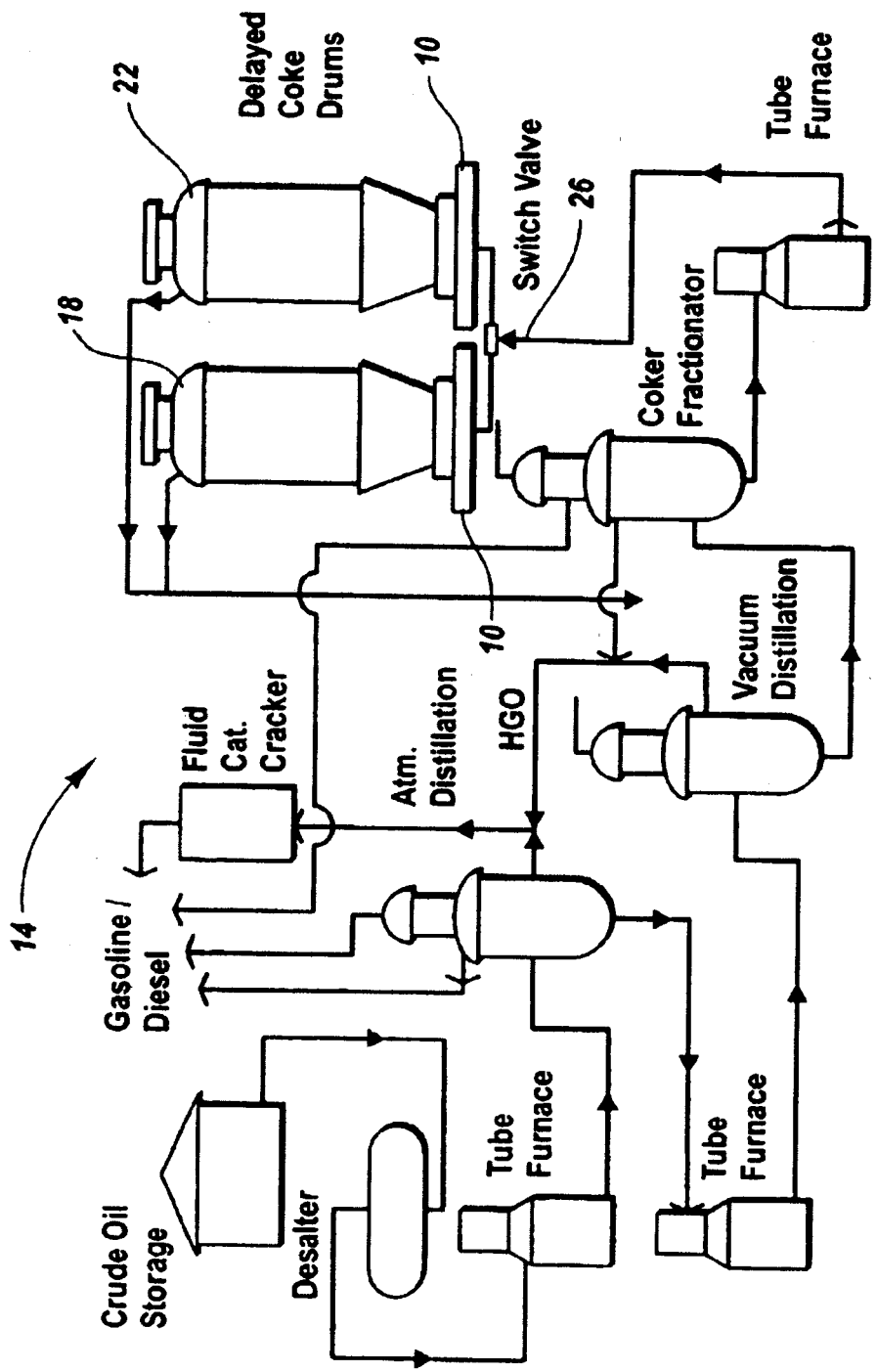
FIG. 1 illustrates, generally, the refinery process, wherein coke is manufactured from the refinery byproducts in a series of coke drums.

It will be readily understood that the components of the present invention, as generally described and illustrated in the figures herein, could be arranged and designed in a wide variety of different configurations. Thus, the following more detailed description of the embodiments of the system, device, and method of the present invention, and represented in FIGS. 1 through 11, is not intended to limit the scope of the invention, as claimed, but is merely representative of the presently preferred embodiments of the invention.

The presently preferred embodiments of the invention will be best understood by reference to the drawings wherein like parts are designated by like numerals throughout. Although reference to the drawings and a corresponding discussion follow below, it is first advantageous to provide a general background of the coking process, including the process of de-heading the coke drums at the end of a manufacturing cycle.

General Discussion on Delayed Coking and Coke De-Heading

In the typical delayed coking process, high boiling petroleum residues are fed to one or more coke drums where they are thermally cracked into light products and a solid residue—petroleum coke. The coke drums are typically large cylindrical vessels having a top head and a conical bottom portion fitted with a bottom head. The fundamental goal of coking is the thermal cracking of very high boiling point petroleum residues into lighter fuel fractions. Coke is a byproduct of the process. Delayed coking is an endothermic reaction with a furnace supplying the necessary heat to complete the coking reaction in a drum. The exact mechanism is very complex, and out of all the reactions that occur, only three distinct steps have been isolated: 1) partial vaporization and mild coking of the feed as it passes through the furnace; 2) cracking of the vapor as it passes through the coke drum; and 3) cracking and polymerization of the heavy liquid trapped in the drum until it is converted to vapor and coke. The process is extremely temperature-sensitive with the varying temperatures producing varying types of coke. For example, if the temperature is too low, the coking reaction does not proceed far enough and pitch or soft coke formation occurs. If the temperature is too high, the coke formed generally is very hard and difficult to remove from the drum with hydraulic decoking equipment. Higher temperatures also increase the risk of coking in the furnace tubes or the transfer line. As stated, delayed coking is a thermal cracking process used in petroleum refineries to upgrade and convert petroleum residuum (or resid) into liquid and gas product streams leaving behind a solid concentrated carbon material, or coke. A fired heater is used in the process to reach thermal cracking temperatures, which range upwards of 1,000° F. With short residence time in the furnace, coking of the feed material is thereby "delayed" until it reaches large coking drums downstream of the heater. In normal operations, there are two coke drums so that when one is being filled, the other may be purged of the manufactured coke. These coke drums are large structures that are approximately 25–30 meters in height and from 4 to 9 meters in diameter. They are equipped with a top blind flange closure or orifice that is typically about 1.5 meters in diameter, and a bottom blind flange orifice that is typically about 2 meters in diameter.

In a typical petroleum refinery process, several different physical structures of petroleum coke may be produced. These are namely, shot coke, sponge coke, and/or needle coke, and are each distinguished by their physical structures and chemical properties. These physical structures and chemical properties also serve to determine the end use of the material. Several uses are available for manufactured coke, some of which include fuel for burning, the ability to be calcined for use in the aluminum, chemical, or steel industries, or the ability to be gasified to produce steam, electricity, or gas feedstock for the petrochemicals industry.

To produce the coke, a delayed coker feed originates from the crude oil supplied to the refinery and travels through a series of process members and finally empties into one of the coke drums used to manufacture coke. A basic refinery flow diagram is presented as FIG. 1, with two coke drums shown. The delayed coking process is a batch-continuous process, which means that the process is ongoing or continuous as the feed stream coming from the furnace alternates filling between the two or more coke drums. As mentioned, while one drum is on-line filling up with coke, the other is being stripped, cooled, decoked, and prepared to receive another batch. This is a timely process, with each batch in the batch-continuous process taking approximately 12–20 hours to complete. In essence, hot oil, or resid as it is commonly referred to as, from the tube furnace is fed into one of the coke drums in the system. The oil is extremely hot and produces hot vapors that condense on the colder walls of the coke drum. As the drum is being filled, a large amount of liquid runs down the sides of the drum into a boiling turbulent pool at the bottom. As this process continues, the hot resid and the condensing vapors cause the coke drum walls to heat. This naturally in turn, causes the resid to produce less and less of the condensing vapors, which ultimately causes the liquid at the bottom of the coke drum to start to heat up to coking temperatures. After some time, a main channel is formed in the coke drum, and as time goes on, the liquid above the accumulated coke decreases and the liquid turns to a more viscous type tar. This tar keeps trying to run back down the main channel which can coke at the top, thus causing the channel to branch. This process progresses up through the coke drum until the drum is full, wherein the liquid pools slowly turn to solid coke. When the first coke drum is full, the hot oil feed is switched to the second coke drum, and the first coke drum is isolated, steamed to remove residual hydrocarbons, cooled by filling with water, opened, and then decoked. This cyclical process is repeated over and over again in the manufacture of coke.

The decoking process is the process used to remove the coke from the drum upon completion of the coking process. Due to the shape of the coke drum, coke accumulates in the area near and attaches to the heads during the manufacturing process. To decoke the drum, the heads must first be removed Typically, once full, the drum is vented to atmospheric pressure and the top head (typically a 4-foot diameter flange) is unbolted and removed to enable placement of a hydraulic coke cutting apparatus. After the cooling water is drained from the vessel, the bottom head (typically a 7-foot-diameter flange) is unbolted and removed. This process is commonly known as "de-heading" and can be a very dangerous procedure because of the size of the flanges, the high temperatures within the drum, potential falling coke, and other reasons as mentioned above. Once the heads are removed, the coke is removed from the drum by drilling a pilot hole from top to bottom of the coke bed using high pressure water jets. Following this, the main body of coke left in the coke drum is cut into fragments which fall out the bottom and into a collection bin, such as a bin on a rail cart, etc. The coke is then dewatered, crushed and sent to coke storage or loading facilities.

Present Invention Coke Drum De-heading System

Although the present invention is intended to cover both top and bottom de-heading systems, or rather the de-heading system of the present invention may be applicable and utilized on both the top and bottom openings of a coke drum, the following detailed description and preferred embodiments will be discussed in reference to a bottom de-heading system only. One ordinarily skilled in the art will recognize that the invention as explained and described herein for a coke drum bottom de-heading system may also be designed and used as a coke drum top de-heading system and the following discussion pertaining to the bottom de-heading system is not meant to be limiting to such.

The present invention describes a method and system for de-heading a coke drum following the manufacture of coke therein. As the present invention is especially adapted to be used in the coking process, the following discussion will relate specifically in this manufacturing area. It is foreseeable however, that the present invention may be adapted to be an integral part of other manufacturing processes producing various elements other than coke, and such processes should thus be considered within the scope of this application.

The present invention comprises a system comprising a dual seated, linear motion, goggle blind valve, or de-header valve.

Figure 2:
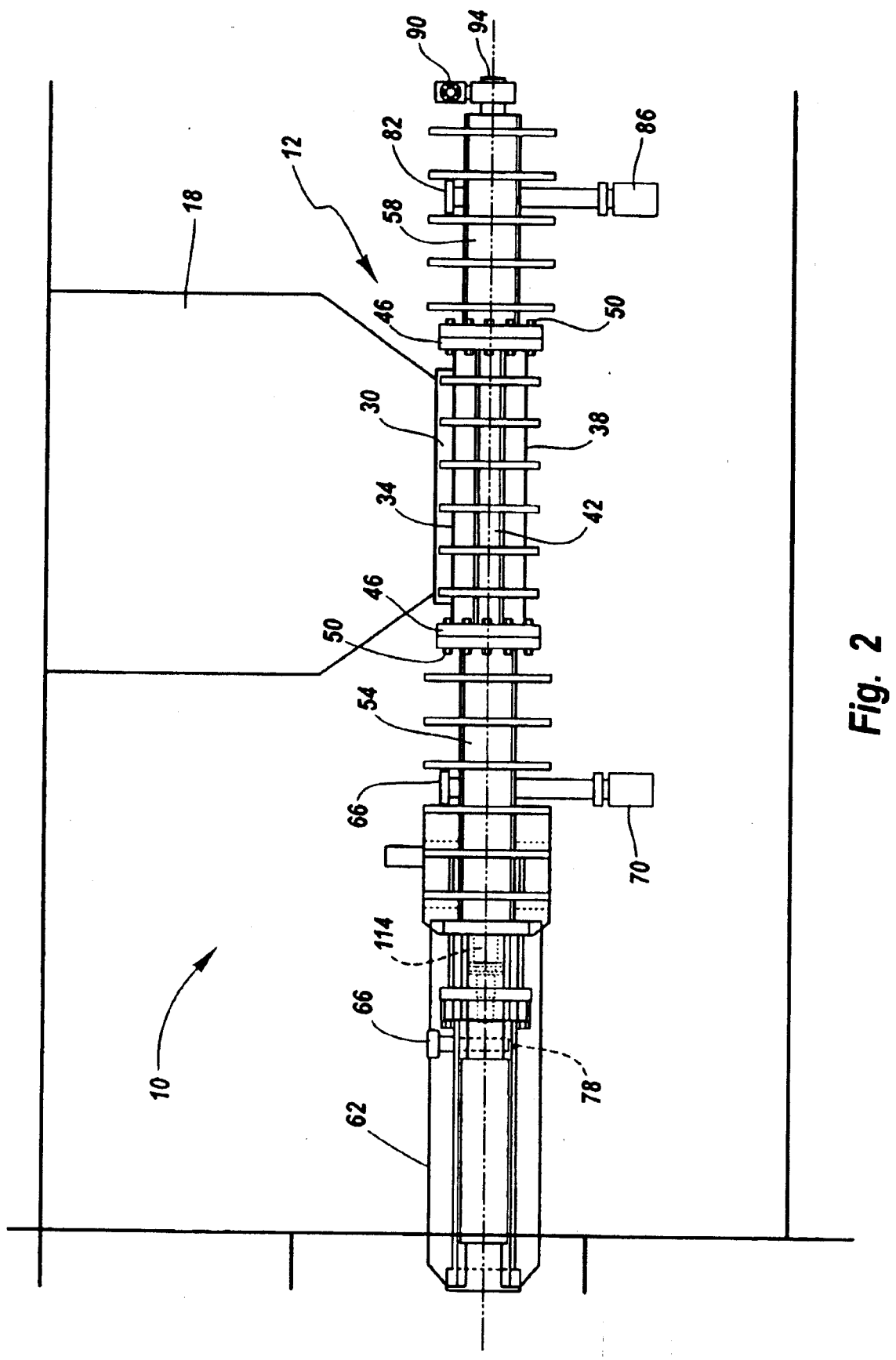
FIG. 2 illustrates the de-heading system of the present invention coupled a coke drum and an upper and lower bonnet.

FIG. 1 depicts, generally, a petroleum manufacturing and refinery process 14 having several elements and systems present (identified, but not discussed). In addition to these elements, petroleum manufacturing and refinery process 14 includes first and second delayed coke drums 18 and 22, respectively. As mentioned, there are typically two coke drums in simultaneous operation so as to permit the ongoing manufacture and refinery of petroleum as well as its coke byproduct. While first coke drum 18 is online and being filled via feed inlet 26, second coke drum 22 is going through a decoking process to purge the manufactured coke contained therein. Thereafter, when first coke drum 18 has reached capacity, feed inlet 26 is switched to second coke drum 22 that has just previously been purged of its contents, whereby first coke drum 18 is primed for the decoking process where its contents will be purged. This process, commonly referred to as batch-continuous, allows the refinery to maintain continuous uninterrupted operation. Of course there may be only one coke drum or a plurality of coke drums present. FIGS. 1 and 2 also show the addition of coke drum de-heading system 10, including de-header valve 12 and its place within the refinery process. Although FIG. 1 is illustrative of a petroleum manufacturing and refinery process having two coke drums in series, and although the discussion and preferred embodiments illustrated, described, and discussed herein focus on a coke drum de-heading system, one ordinarily skilled in the art will recognize that the present invention may be applicable or adapted to a number of different processes in which a function similar to the coking process is present.

Figure 3:
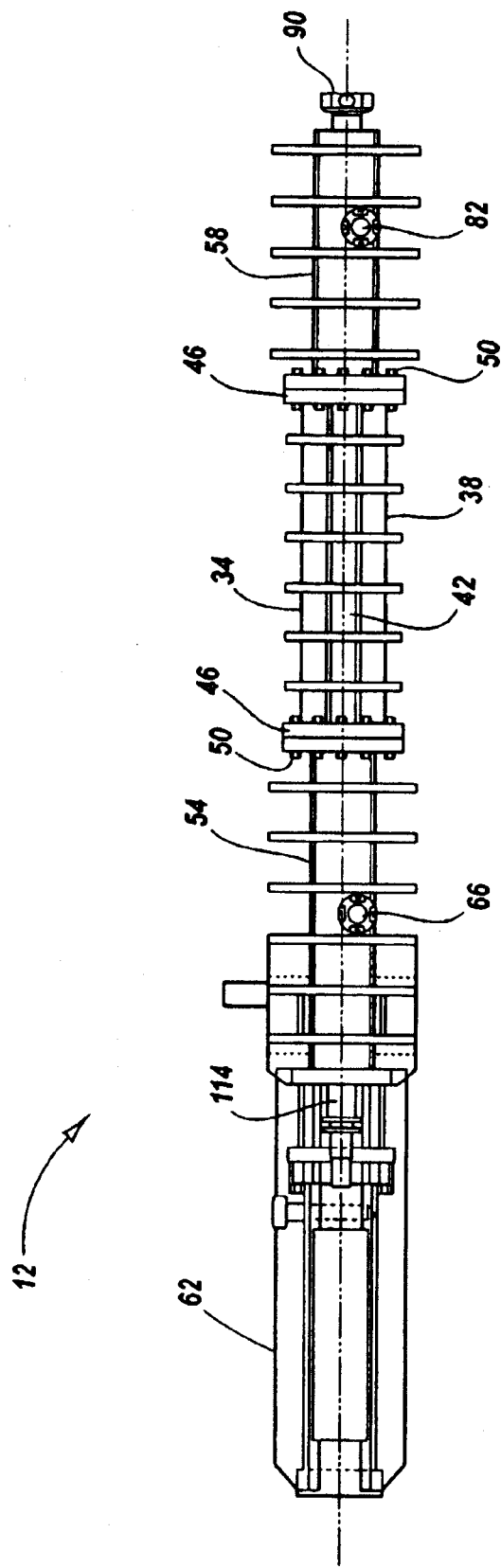
FIG. 3 illustrates a front view of the coke drum de-heading system according to the present invention, and an upper and lower bonnet attached thereto.

In reference to FIGS. 2 and 3, a general front view of coke drum de-heading system 10 is shown, with FIG. 2 showing system 10 attached or coupled to first coke drum 18. In light of the identical nature and setup of coke drum de-heading systems 10 on first and second coke drums 18 and 22 respectively, only first,coke drum 18 will be discussed throughout the application. Specifically, coke drum de-heading system 10 is removably coupled to coke drum 18 to allow the system to be removed if necessary. As shown, coke drum de-heading system 10 comprises a de-header valve 12 having a body 46 and upper and lower seats, 34 and 38 respectively, attached thereto. Body 46 comprises a flanged portion 42 that consists of substantially the same dimensions as the corresponding opening, whether flanged or otherwise, of coke drum 18. As shown, flanged portion 42 is coupled to flanged portion 30 on coke drum 18 using those means known in the art, which is typically a bolted flanged connection. Flanged portion 30 is a part of the "head" of coke drum 18, depending upon the design of coke drum 18, de-header valve 12 may be coupled to flanged portion 30 or directly to the body of coke drum 18. The significance of the present invention, as opposed to prior art de-heading systems and devices, is that the coke drum de-heading system 10 of the present invention does not require the "head" of the coke drum to be removed each time the drum is to be decoked. This significance is discussed at greater length below. Various sealing members and agents are used to seal de-header valve 12 to coke drum 18 to prevent inadvertent leaking.

Upper seat 34 and lower seat 38 are comprised of a dynamic, live loaded seat and a static seat, with the preferred configuration comprising a dynamic live loaded upper seat 34, and a static lower seat 38. An alternative embodiment may comprise a dynamic, live loaded lower seat and a static upper seat. In the preferred embodiment, the static seat is a one piece seat that is securely fastened to de-header valve 12 and is preferably non-adjustable. However, it is within the scope of this invention that both the upper and lower seats could be dynamic and/or adjustable, or that both the upper and lower seats could be static. In contrast to the static seat, dynamic, live loaded seat is a moveable and adjustable seat that is energized from without the process stream via live seat adjustment mechanism. The function of the dynamic, live loaded seat is to provide point to point fine tuning of the system, and particularly the blind as it is sealed between upper and lower seats 34 and 38. Various sealing members, such as O-rings, may be used to seal the seats and their adjacent seat retainers to de-header valve 12.

FIGS. 2 and 3 also depict upper bonnet 54 and lower bonnet 58 coupled to body 46 of de-header valve 12. Upper bonnet 54 and lower bonnet 58 are removably coupled to body 46 using known means such as bolts 50 as shown. Upper bonnet 54 and lower bonnet 58 are shown having various elements thereon to operate within the refinery process. Upper bonnet 54 is shown equipped with steam purge outlet port 66 and an outlet steam trap and orifice assembly 70. Upper bonnet also is shown having a pressure transmitter 74 and a pressure gauge 78. Lower bonnet 58 is shown having a steam purge inlet port 82 and an inlet steam trap and orifice plate assembly 86 coupled thereto. Lower bonnet 58 also is shown having a vent valve assembly 90 and outlet pipe 94. Vent valve assembly is located on a distal end of lower bonnet 58 and serves as an emergency release. Upon the introduction of a pressure into the system that is above the upper limit, emergency vent valve is activated, which releases pressure from the system and drains any excess fluid and gas through pipe 94. Each of these additions are used to control and monitor the pressurized environment existing within the system. One ordinarily skilled in the art will recognize the needed applications and devices to maintain a suitable environment during the coking process.

In addition to the features mentioned above, upper and lower bonnets 54 and 58, respectively, are independent of one another, yet may be in communication with one another. For example, depending upon the system requirements and specifications, upper bonnet 54 may be pressurized and lower bonnet 58 may be purged to maintain system equilibrium requirements.

FIGS. 2 and 3 are also illustrative of actuator 62 and ram 114. Actuator 62 is used to drive ram 114, which provides the actual physical control of the blind 106 (not shown) of de-header valve 12. Actuator 62 and ram 114 provide the sliding lateral bi-directional movement to blind 106, which is used to open and close de-header valve 12 as needed. A significant advantage to the present invention is the ability to virtually eliminate human or manual involvement or presence during the manufacturing process. For example, due to the design and functionality of de-header valve 12 actuator 62 may be controlled or actuated from a location remote from the actual site of the coke drums. As actuator 62 is a hydraulic pump in a preferred embodiment, it is not necessary to actually activate actuator 62 at the site. Rather, any known means in the art may be used to control actuator 62 a safe distance away from the coke drums. As a result, the safety and ease of operation provide an advantage not found in prior art designs. Actuator 62 and ram 114 are each discussed in greater detail below in accordance with their corresponding figure(s).

Figure 4:
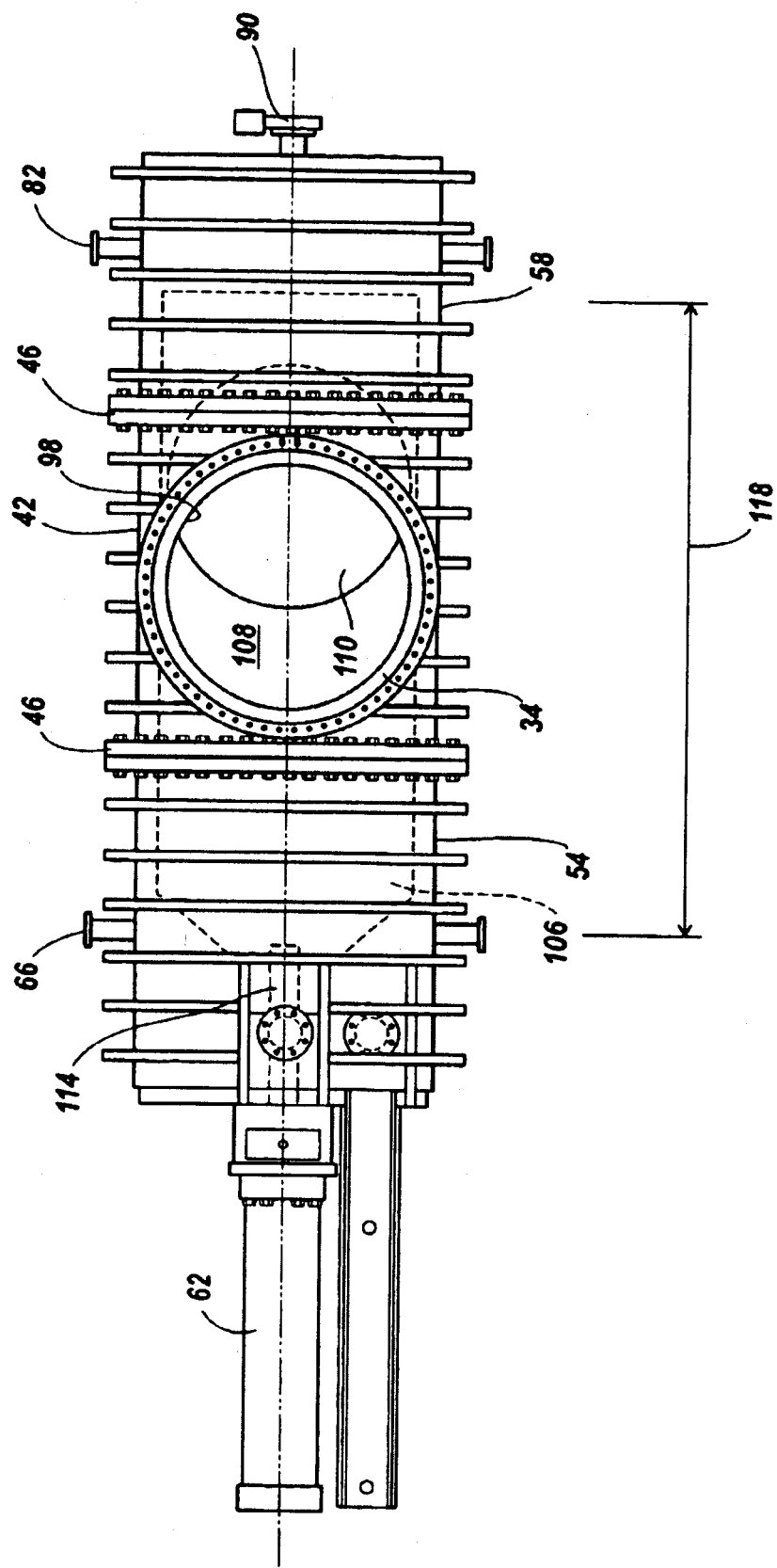
FIG. 4 illustrates a top view of the coke drum de-heading system showing the orifice and the sliding blind contained therein.

FIG. 4 illustrates a top view of coke drum de-heading system 10. Specifically, de-header valve 12 comprises a body 46 having an orifice 98 surrounded by a flanged portion 42 used to couple the de-header valve 12 to coke drum 18. Also shown is upper seat 34, which is a dynamic, live loaded seat contained within flanged portion 42. Although not shown in FIG. 4, de-header valve 12 comprises a lower static seat 38. Upper seat 34 and lower seat 38 serve to balance or support blind 106 as it moves or slides in a bi-directional manner through de-header valve 12. Blind 106 is shown in FIG. 4 as comprising a flat surface 108 and an orifice 110 adjacent flat surface 108. Essentially, blind 106 moves laterally within coke drum de-heading system 10 to open and close de-header valve 12. In a closed position, blind 106 is actuated and slid between upper seat 34 and lower seat 38, such that flat surface 108 completely blocks the opening in coke drum 18. In this closed position, coke drum 18 is ready to receive inlet feed 26, wherein coke drum 18 is filled with the petroleum byproduct, or resid, used to manufacture coke. Blind 106 is a dual seated blind, meaning that it is supported on either side from opposing or counteracting upper and lower seats 34 and 38, respectively. In addition, since upper seat 34 (or lower seat 38 in an alternative embodiment) is a dynamic, live loaded seat having adjustable properties, blind 106 is a "floating" blind in the sense that it is biased as a result of the biased nature of dynamic, live loaded upper seat 34. When the device comprises static seat 34 and static seat 38, blind 106 moves within the tolerances between the space static seat 34 and static seat 38 and the height or thickness of blind 106.

Upon actuation of actuator 62 and ram 114 coupled thereto and to blind 106, blind 106 is caused to slide substantially laterally in a bi-directional manner between upper seat 34 and lower seat 38 into an open or partially open position, such that orifice 110 is brought into alignment with orifice 98 of de-header valve 12, which in turn causes alignment with the opening in coke drum 18. In this position, coke drum 18 may be decoked, or purged of its contents in traditional known methods. As such, flat surface 108 of blind 106 is retracted out of the way as blind 106 is slid in a substantially lateral manner in order to bring orifice 110 into proper alignment. Therefore, by sliding blind 106 back and forth, de-header valve 12 is opened and closed as needed. Blind 106 may be said to comprise a stroke having a distance long enough, such that blind 106 may close and seal de-header valve 12 using flat surface 108, and open de-header valve 12 when orifice 110 is properly aligned with orifice 98 and the opening in coke drum 18. The interim stages when blind 106 is moving from a closed position to an open position represents a critical aspect of the present invention as it is during these stages that the coke drum de-heading system performs the process of "de-heading" or "unheading" coke drum 18 in a significantly more effective and safe manner than prior art designs.

Figure 5:
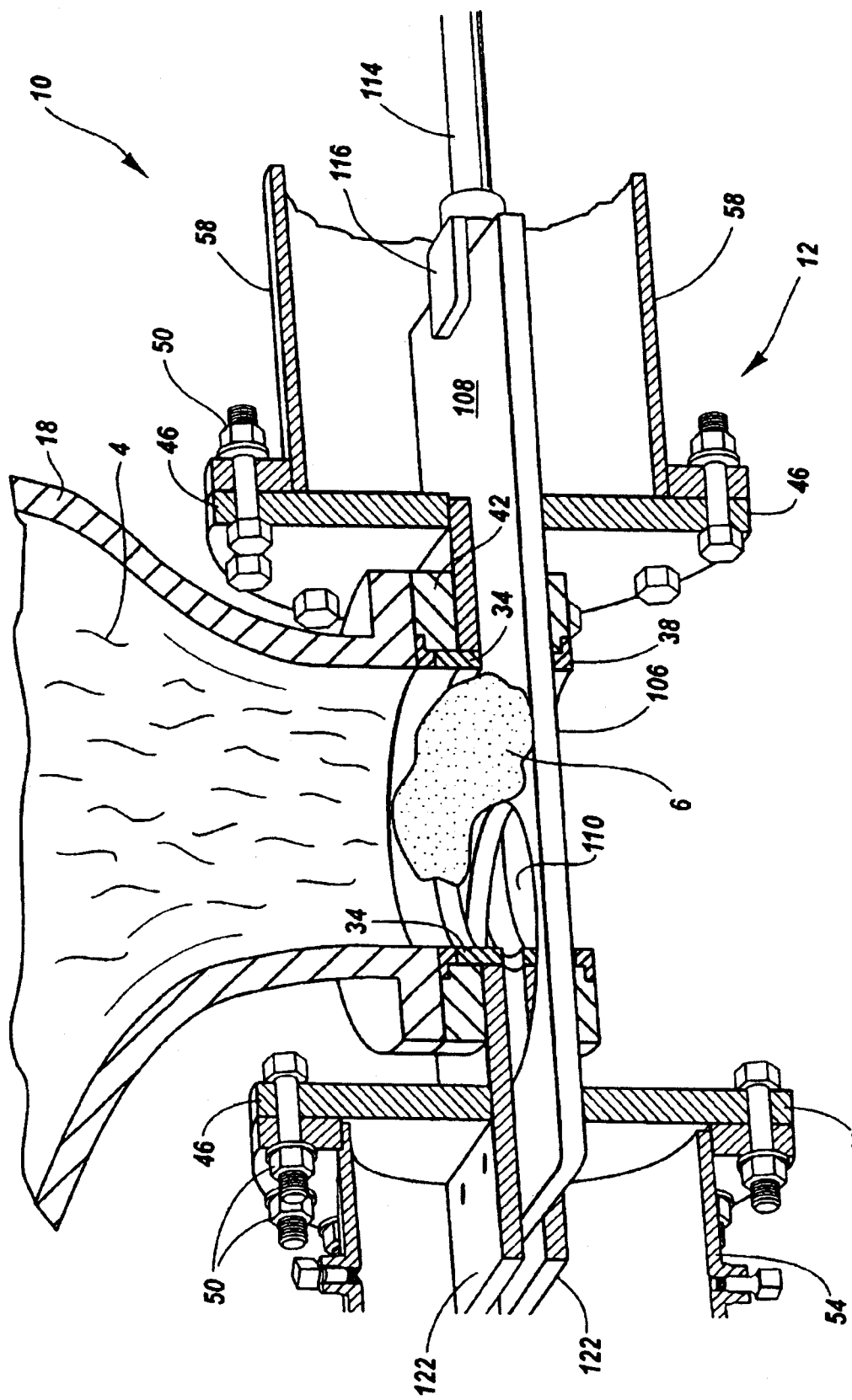
FIG. 5 illustrates a cut away view of the de-header valve attached to a coke drum containing coke, and specifically, the sliding blind in a partially opened position and its relationship and interaction with the de-header valve as it being used to de-head the coke drum.

FIG. 5 is illustrative of a cut away view of de-header valve 12, and particularly the relationship between de-header valve 12, having blind 106, and coke drum 18. Actuator 62 (not shown) controls ram 114, which couples to blind 106 via attachment means 116. Actuator 62 is preferably a hydraulic pump capable of producing the required forces to slide blind 106 in its substantially lateral manner within de-heading system 10. As discussed, blind 106 is supported on either side by upper seat 34 and lower seat 38. As a result, and due to the nature of the coke manufacturing process in which the system is under extreme temperature and pressure, a large force must be applied to blind 106 from upper and lower seats 34 and 38, such that the system is substantially sealed and the pressure within the system maintained. Due to the existence of a dynamic, live loaded seat de-header valve 12, and particularly the dynamic, live loaded seat, is capable of modulating any bowing in blind 106 that may exist during the coking process. The same effect can be accomplished using a dual static set configuration. In a normal coking process, extreme temperatures and pressures are present. Any variation in temperature between the upper and lower surfaces of the blind can cause the blind to bow. If the bowing is allowed to progress or continue, there is a danger in breaking the seal created between upper and lower seats 34 sand 38 and blind 106, which could cause damage to the system and upset the manufacturing process. However, the ability of the present invention to adjust the load exerted on blind 106, utilizing the dynamic, live loaded seat and its adjustment mechanism, or sealing between seat 34 and 38, provides a way to prevent, compensate for or modulate any existing bowing that might occur. By increasing the applied load of the dynamic, live loaded seat on blind 106, the bowing is substantially eliminated, thus returning blind 106 to a more natural shape.

In order to move blind 106, actuator 62 must be comprised of sufficient strength so as to be able to overcome this initial seal and provide the necessary force to slide blind 106 back and forth between an open and closed position. One ordinarily skilled in the art will recognize that other types of devices or systems may be used, other than a hydraulic pump, to actuate blind 106 and to overcome the forces exerted on blind 106 by upper seat 34 and lower seat 38, thus this should not be limiting in any way.

FIG. 5 illustrates coke drum 18 coupled to and sealed to de-header valve 12. Specifically, the flanged portions of each are coupled together using commonly known means, such as a bolted connection. FIG. 5 is primarily used to illustrate blind 106, having orifice 110 and flat surface 108, and its service in de-heading coke drum 18. De-header valve 12 is shown in a partially open position. In a closed position, flat surface 108 would align with orifice 98 and the opening of coke drum 18, such that the system, and particularly coke drum 18, would be ready to receive feed inlet 26. Blind 106 has an end portion that settles into a blind shroud 122 when de-header valve 12 is closed.

Coke drum 18 is also cut away to show the presence of coke 4 therein, and particularly coke head 6 and its relative position within system 10. During the manufacturing process, resid is pumped into coke drum 18, thereby ultimately producing coke 4 that is contained within coke drum 18. In the beginning stages when coke drum 18 is being filled with resid, a large portion will naturally accumulate at the bottom of the drum and on flat surface 108, thus forming a "head" near the opening of de-header valve 12. This accumulation causes flat surface 108 of blind 106 to be caked with coke. As the resid sets up and coke is formed, this "head" must be removed in order to decoke the entire drum and purge the drum of the coke bed contained therein. This is essentially done by the present invention by sliding blind 106 from a closed position to an open position. As can be seen in FIG. 5, blind 106 is supported by upper and lower seats 34 and 38. Not only is blind 106 supported, but rather large forces are applied to blind 106 through these seats in order to enable a suitable pressurized environment. As such, the tolerances between upper and lower seats 34 and 38 and blind 106 are extremely tight. Because of these tight tolerances, and the accumulation of coke 4 on flat surface 108, as blind 106 is displaced from its closed position, coke 4, and particularly coke head 6, is sheared by upper seat 34 from off of flat surface 108. This shearing effect breaks up the coke that has accumulated on blind 106, thus essentially de-heading coke drum 18, wherein coke drum 18 is prepared for the decoking process.

As a result of the load exerted upon blind 106 and resulting tight tolerances existing between blind 106 and upper and lower seats 34 and 38, the substantially lateral bi-directional movement of blind 106 between upper and lower seats 34 and 38 causes a grinding and polishing effect to occur. In a preferred embodiment, upper and lower seats 34 and 38, as well as blind 106 are made of metal, thus providing a metal to metal contact or metal to metal seal, or otherwise referred to as metal to metal seating of blind 106. This metal to metal seating is a unique aspect of the present invention in relation to coke drum de-heading. The metal to metal seating increases the durability of the system as there are no non-metal parts, such as vinyl or rubber, used to seal the seats to blind 106. Metal to metal seating allows the system to achieve a higher consistency of sealing, while at the same time providing extended wear and durability. In addition, the metal to metal scaling allows the system, and specifically the sealing within the system, to be fine-tuned as discussed below.

Upper seat 34 and lower seat 38 are independent of one another and provide definitive double block and bleed/double block and purge capabilities.

A further feature of the present invention is the enclosure of the seating used to seal the system. Upper seat 34 and lower seat 38 are completely protected from the flow of material passing through orifice 98, such that they are not in the direct line of flow. As such, there is a decreased chance of erosion to the finish of upper and lower seats 34 and 38, as well as decreased erosion potential. This becomes critical in that the present invention allows for fine-tuning of upper and lower seats 34 and 38 to more directly and precisely control sealing on a point to point basis against blind 106.

As a result of this type of seating, the metal to metal contact coupled with the lateral bi-directional movement of blind 106 and the tight tolerances existing therein effectuates this polishing. This polishing effect over time provides for much smoother transitions of blind 106 between an open and closed position. In other words, the force required to displace blind 106 becomes less and less over time due to the smooth, polished metal to metal contact between upper and lower seats 34 and 38 and blind 106. In addition to the metal to metal contact, upper and lower seats 34 and 38 may be finished, such as with a hardened chrome. Blind 106 may also be finished, such as with a nitride coating that is integrated into the molecular structure of blind 106. Providing a finish to these elements creates significant advantages, such as increased wear, thus prolonging their replacement, and increasing performance while in operation.

Figure 6:
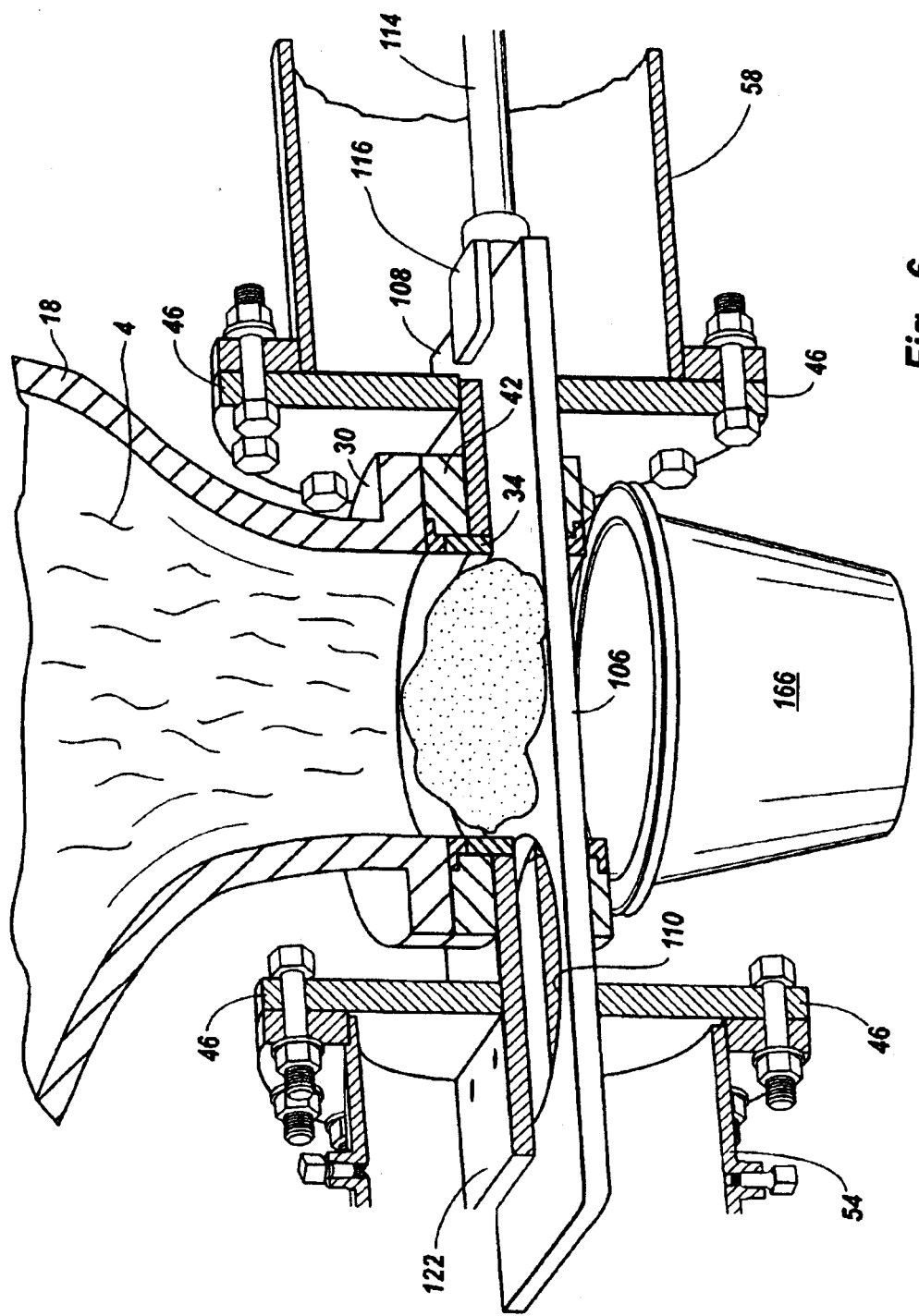
FIG. 6 illustrates an enlarged cut-away sectional view of the de-header valve as it is attached to a coke drum containing manufactured coke, and particularly, the de-header valve with the sliding blind in a substantially closed position where coke accumulates on the surface of the sliding blind during the coking process.
Figure 7:
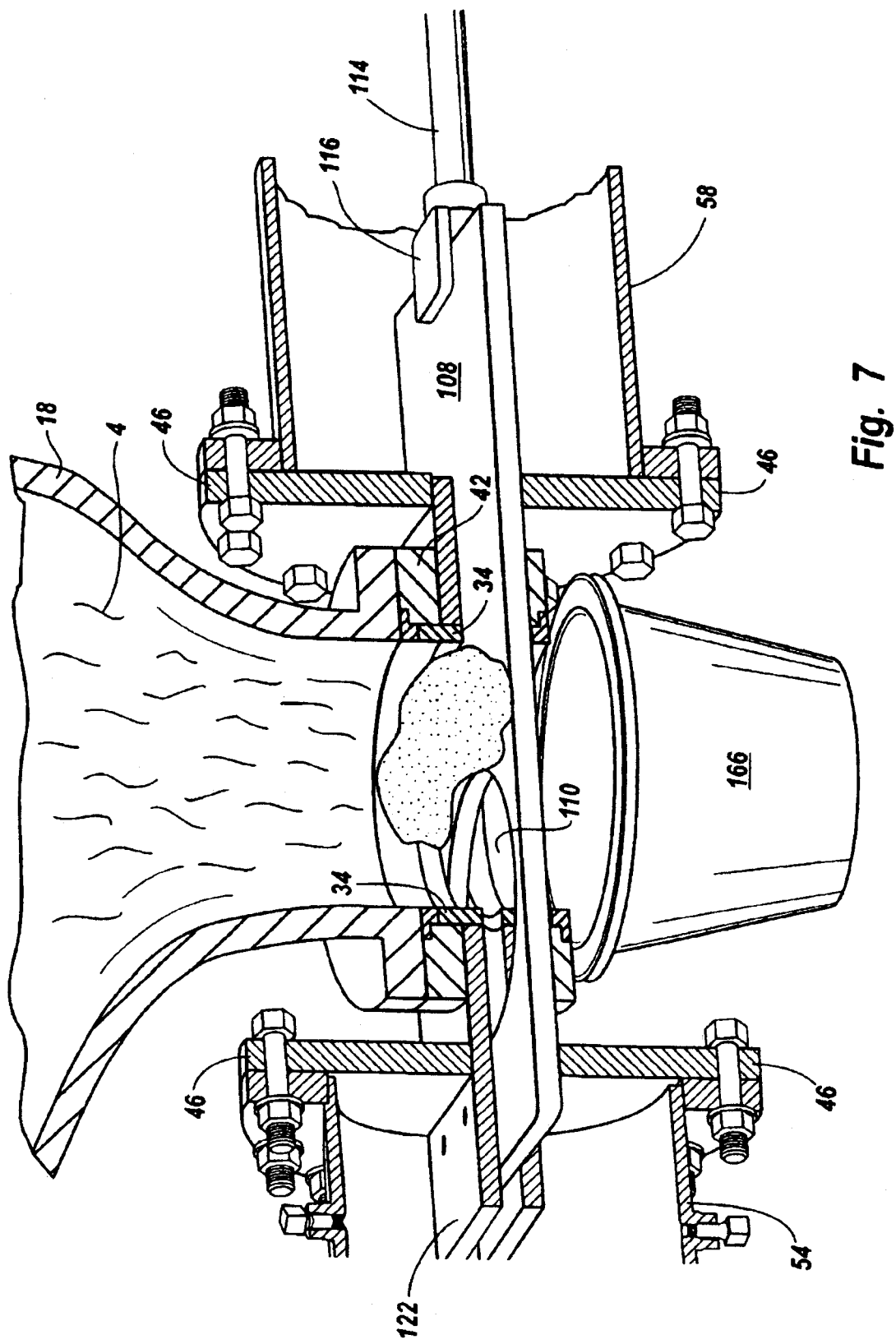
FIG. 7 illustrates an enlarged cut-away sectional view of the de-header valve as it is attached to a coke drum containing manufactured coke, and particularly, the de-header valve with the sliding blind in a partially opened position as it is being used to de-head the coke drum.

FIGS. 6 and 7 show de-header valve 12, and particularly blind 106, as it progresses from a substantially closed position (FIG. 6) to a substantially open position (FIG. 7), thus representing the interim stages when blind 106 is being slide laterally and coke drum 18 is essentially "de-headed." As blind 106 is closed, coke 4 accumulates on flat surface 108 of blind 106, such that blind 106 is caked with coke. Once coke drum 18 is full, feed inlet 26 is switched off or routed to a second coke drum. After the pre-coking steps are performed, the coke drum must be de-headed in order to allow the rest of the coke bed contained within the drum to be removed using standard procedures. To de-head coke drum 18, an operator simply actuates actuator 62 from some location remote from the coking site, thus causing blind 106 to begin to move laterally in a bi-directional manner within de-header valve 12. As actuator 62 is initially activated, a large force is required to move blind 106 due to the seal between blind 106 and upper and lower seats 34 and 38 that must be broken and the initial shearing of coke 4 that has accumulated on flat surface 108 of blind 106. FIG. 6 shows how coke 4 begins to break free and build up along the inside edge of upper seat 34 as blind 106 is displaced. As blind 106 is displaced further, more coke 4 is freed and builds up. In addition, as orifice 110 is brought into alignment, that portion of coke 4 that has broken free is allowed to drop through orifice 98 of de-header valve 12 into catch basin 166. Catch basin 166 may be any known device or system known in the art, such as a rail cart, etc.

FIG. 7 shows blind 106 in a more partially opened position. As can be seen, coke 4, and particularly coke head 6, is sheared from flat surface 108 of blind 106 the more blind 106 is opened. The lateral displacement of blind 106 from a closed to an opened position serves to de-head coke drum 18. The tight tolerance between upper and lower seats 34 and 38 and blind 106 are such that coke 4 is not allowed to pass under upper seat 34, but is sheared off and contained within the seat boundaries. Coke 4 should not pass under upper seat 34 as blind 106 is being opened as this would damage the polished surfaces being attained by the bi-directional movement of blind 106 between upper and lower seats 34 and 38. Once opened, de-header valve 12 is not required to be removed from coke drum 18 prior to decoking the entire drum. Essentially, workers may decoke coke drum 18 using standard procedures. Once finished, the operator simply deactivates actuator 62, such that blind 106 returns to a closed position, whereby coke drum 18 may again be filled with resid and put through the identical process. A great advantage of the present invention, among others, is that there is only one main moving part (blind 106) used to de-head the coke drum and that this part is entirely enclosed within a valve that may be attached to the coke drum without having to be removed after each consecutive cycle.

FIGS. 8–11 represent the live loaded seat concept as applied to the coke drum de-heading system 10, and specifically the de-header valve 12, of the present invention. FIG. 8 illustrates de-header valve 12 having a live loaded seat assembly 132 and a static seat assembly 136. Live loaded seat assembly 132 is comprised of a dynamic live loaded seat, shown as upper seat 34, and a live seat adjustment mechanism 134 used to adjust and control the load exerted by the dynamic live loaded seat upon flat surface 108 of blind 106. Live loaded seat assembly 132 further comprises a force transfer module 162, shown in FIG. 8 as a wedged member, whose primary purpose is to transfer the load exerted by live seat adjustment mechanism 134 to the dynamic live loaded seat, which in turn exerts a resulting force upon flat surface 108 of blind 106. Force transfer module 162, or wedged member, is constructed having an angled section, which corresponds directly with a matching angled portion on the dynamic, live loaded seat.

FIG. 8 also shows seat retaining rings 126, whose function is to secure and hold upper seat 34 in place within de-header valve 12. Seat retaining rings 126 are securely coupled to de-header valve 12, using any number and orientation as necessary. Seat retaining rings 126 must be securely fastened so as to remain in a fixed position at all times. As shown, upper seat 34 exists as the dynamic live loaded seat described herein. Lower seat 38, which is shown as a static seat, also is secured and held in place by a lower seat retaining ring similar to that as an upper seat retaining ring. Each of the seat retaining rings used in de-header valve 12 are coupled to de-header valve 12 using fastening means 130, which are commonly known in the art.

FIG. 8 also provides an illustrative view of blind 106 and its relationship with upper seat 34 and lower seat 38. In essence, blind 106 comprises a dual-seated linear motion blind having near zero tolerances existing between each of the upper and lower seats and the upper and lower surfaces of blind 106. Such tolerances are necessary to maintain a suitable pressurized environment during the manufacturing process. As mentioned above, upper and lower seats 34 and 38 provide a metal to metal contact with blind 106 such that a seal is created within de-header valve 12. This seal is important as there is a greater load between the seat and the gate, than the load in coke drum 18. This seal enables de-header valve 12 to maintain a suitable pressurized environment during the coke manufacturing process and is attained by the load exerted on blind 106 through dynamic live-loaded seat 34.

Figure 10:
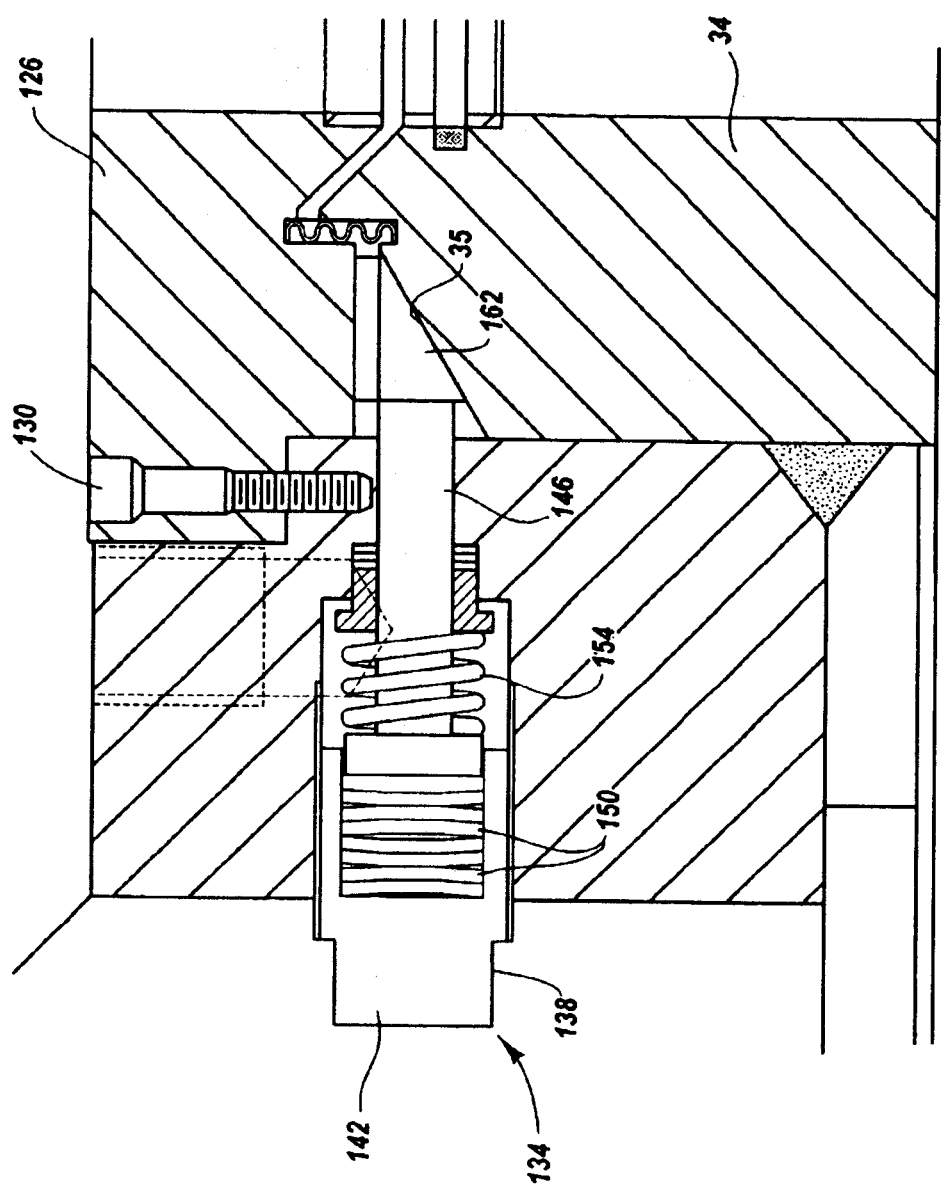
FIG. 10 illustrates one embodiment of the dynamic, live loaded seat and live seat adjustment mechanism.

FIG. 9 illustrates an enlarged view of live-loaded seat assembly 132 as shown in FIG. 8. Live-loaded seat assembly 132 comprises live seat adjustment mechanism 134, force transfer module 162, and a dynamic live-loaded seat, which is shown in FIG. 9 as upper seat 34. Each of these elements works in conjunction with one another to apply and transfer force to blind 106, thus creating the necessary seal and de-heading function as earlier described. Live seat adjustment mechanism 134 itself comprises housing 138, which houses and holds the elements of live seat adjustment mechanism 134. Specifically, housing 138 has contained therein a force applicator 142 that may be manually adjusted depending on the amount and degree of force needed. In a preferred embodiment as shown in FIG. 10, force applicator 142 is simply a threaded member that may be rotated to increase or decrease the load on blind 106. Force applicator 142 is adjacent to and in contact with biased plunger 146. Biased plunger 146 has distal and proximate ends with the distal end being in direct contact with force transfer module 162. As force applicator 142 is activated to increase or decrease the load exerted on blind 106, biased plunger 147 is driven into force transfer module 162, which in turn exerts a resulting force on the dynamic live-loaded seat, or upper seat 34 as shown in FIG. 10, which in turn causes a resulting force to be exerted upon blind 106 at contact 36. As mentioned, seat retaining rings 126 are securely fixed and will not move, thus allowing wedged portion (force transfer module 162), which abuts seat retaining ring 126, to transfer force directly to blind 106 through the dynamic, live loaded seat. The force applied by dynamic, live loaded seat to blind 106 is directly proportional to the force applied by force applicator 142. Thus, to increase the load on blind 106, the operator simply activates force applicator 142. To decrease the load on blind 106, the operator simply deactivates force applicator 142 as force applicator 142 is coupled to de-header valve 12 such that it may be cycled in and out to adjust the pressure or force exerted on blind 106.

Force applicator 142 may be adjustable via manual means, such as a threaded bolt as shown, or via hydraulic or pneumatic means. One ordinarily skilled in the art will recognize the possible ways to apply pressure to force transfer module 162, while maintaining a seal. In addition, load bearing members may also be comprised of any suitable means capable of bearing a biased load and creating a loaded tension force upon force transfer module 162 and the dynamic, live loaded seat.

The dynamic live-loaded seat of the present invention is a biased seat, thus allowing a degree of longitudinal fluctuation of blind 106 both during the manufacturing process when coke drum 18 is being filled, as well as when actuator 62 is activated or deactivated to cause blind 106 to move from a closed position to an open position. This degree of longitudinal motion results in blind 106 moving in a substantially lateral manner. The biasing effects of the dynamic live-loaded seat results from the configuration of live seat adjustment mechanism 134. Specifically, live seat adjustment mechanism 134 comprises a series of biasing elements or load bearing members 150, such as belevue washers and springs 154 that act in conjunction with plunger 146. By biasing the dynamic live-loaded seat, any physical variations or deflections in blind 106 during the manufacturing process or the de-coking process will be absorbed through live-loaded seat assembly 132. This provides a significant advantage as it is not uncommon for blind 106 to go through various stages of deflection as a result of either pressure and/or temperature differentials. The biased nature of the dynamic live-loaded seat will allow de-header valve 12 to maintain a workable pressurized environment as well as to account for any physical or structural changes to de-header valve 12 as a result of the intense environment existing in the manufacturing process.

Although not shown, the present invention of the dynamic seating configuration utilizes four independent sets of dynamic seats such that point to point adjustability is created within four loading zones. These four loading zones significantly increase the ability to adjust and manipulate the de-heading system according to the pressure within the system and the potential locations for leaking. They also allow the use of components that need not be as true or smooth as those used with static seals. The four sets of dynamic seats could even be adjusted to the point wherein an amount of force is applied to the blind such that it is no longer moveable by the actuator. By allowing point to point adjustability, the system is capable of being fine tuned to decrease the chances of unwanted leaks within the system. For example, if the system were leaking at one location, any one of, or multiple, dynamic seats could be adjusted to compensate and seal the leak. The four points are located at approximately equidistant locations about flange 42.

Figure 11:
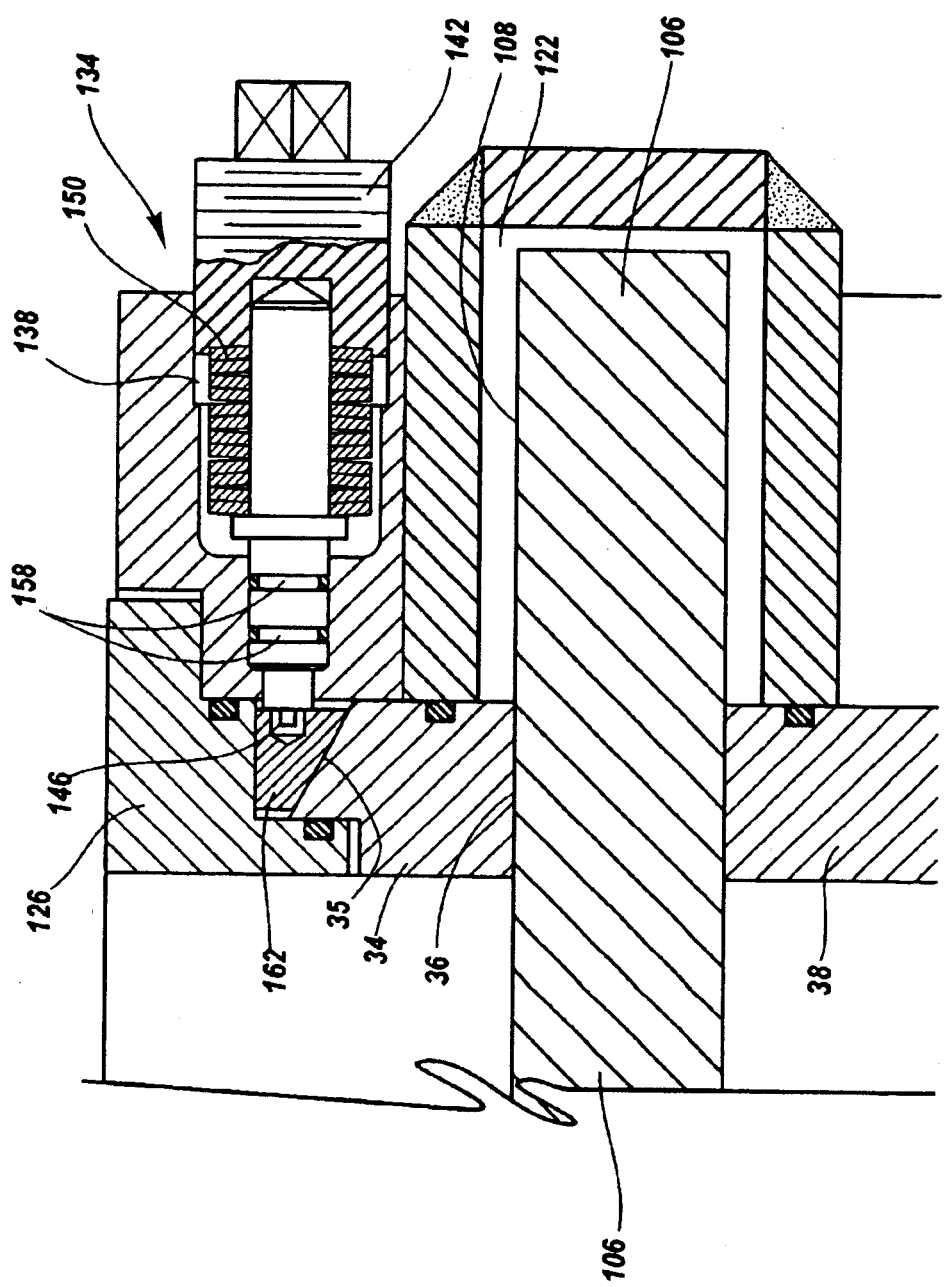
FIG. 11 illustrates an alternative embodiment of the dynamic, live loaded seat and live seat adjustment mechanism.

FIG. 11 is illustrative of an alternative embodiment of live-loaded seat assembly 132.

In addition to the above-described and illustrated features, the system of the present invention functions to control pressure within the system and to prevent leakage into unwanted areas of the system, thus providing for positive isolation. This isolation is accomplished through the use of close tolerances in the metal to metal seating, and resulting sealing. O-rings may also used to improve sealing. In addition, a positive pressure may be introduced from the outside of the valve to prevent venting of the feed stream to atmosphere or into parts of the valve. The system provides for remote verification of positive isolation. This means that steam maybe added to the steam purge inlet to pressurize the valve system outside of the sealed area. This pressure may be used to isolate the feed stream which is at a lower pressure, or it may be used to check the efficiency of the seals. The system is designed to allow remote monitoring of this isolation pressure to verify that the system is not leaking contaminants to atmosphere.

The system, and specifically the dual independent seats, also provides definitive double block and bleed/purge capabilities as well as instant and remote live switching to double block and vent mode from double block and purge mode on loss of purge steam. The metal to metal seal between the gate and the upper and lower seats provide one method of blocking leakage, along with the pressure from the outside of the seals which isolates the feed stream if the pressure is greater outside of the seal. If pressure is leaking, the system may be adjusted using the dual seats as described above to compensate or o-rings may be replaced.

The present invention also features a method for de-heading a coke drum following the manufacture of coke therein. The method comprises the steps of: (a) obtaining at least one coke drum designed for the manufacture of coke; (b) equipping the coke drum with a de-header valve, the de-header valve being removably coupled to the coke drum and itself comprising 1) a main body having means for connecting the de-header valve to the coke drum; 2) a first seat coupled to the main body; 3) a second seat coupled to the main body in an opposite or counteracting position to the first seat; and 4) a blind coupled to the main body and activated by an actuator, wherein the blind is capable of moving in a substantially lateral bi-directional manner within the de-header valve between the upper and lower seats to control the opening and closing of the de-header valve, and the blind providing a seal between the first loaded seat and the static seat; (c) closing the blind and sealing the first seat against the blind so as to seal the de-header valve; (d) manufacturing coke from a refinery process; and (e) de-heading the coke drum by actuating the blind and causing it to slide across the first seat and second seat into an open position, the first seat and second seat thus shearing the coke in the coke drum as the blind is displaced. This method may be utilized on either a bottom or top de-heading system.

Figure 12:
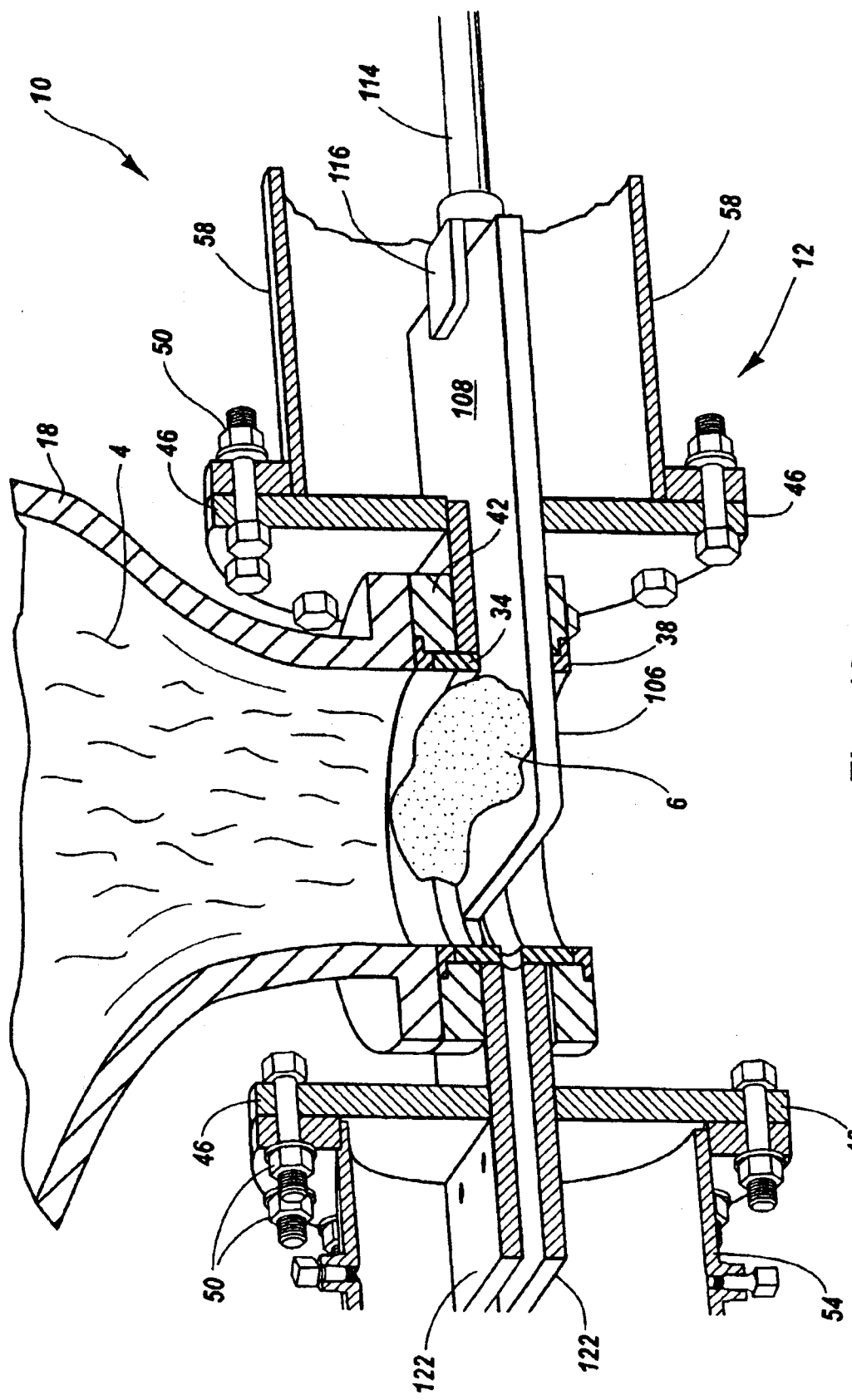
FIGS. 12–14 illustrate alternative configurations of the blind.
Figure 13:
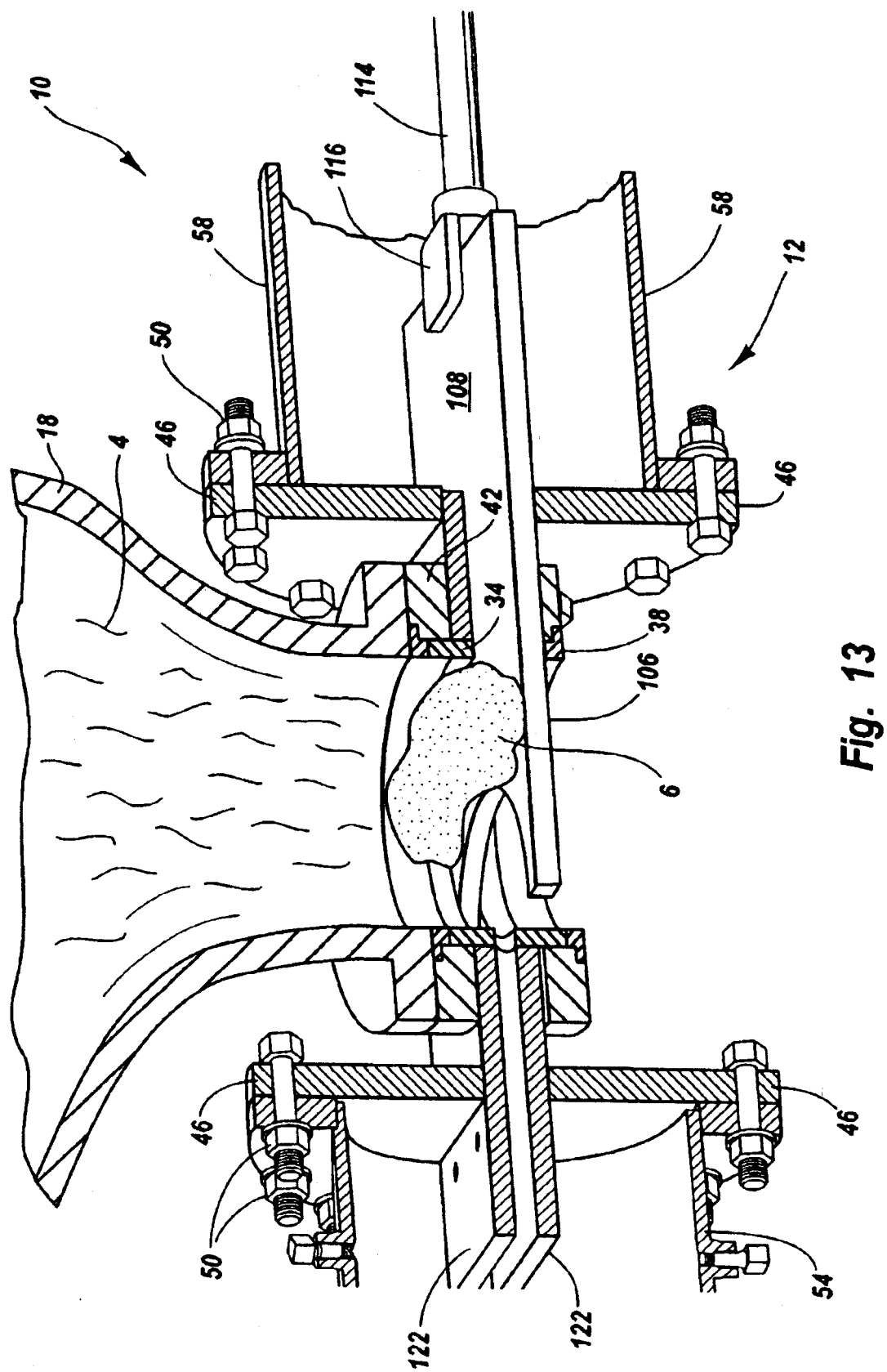
Figure 14:
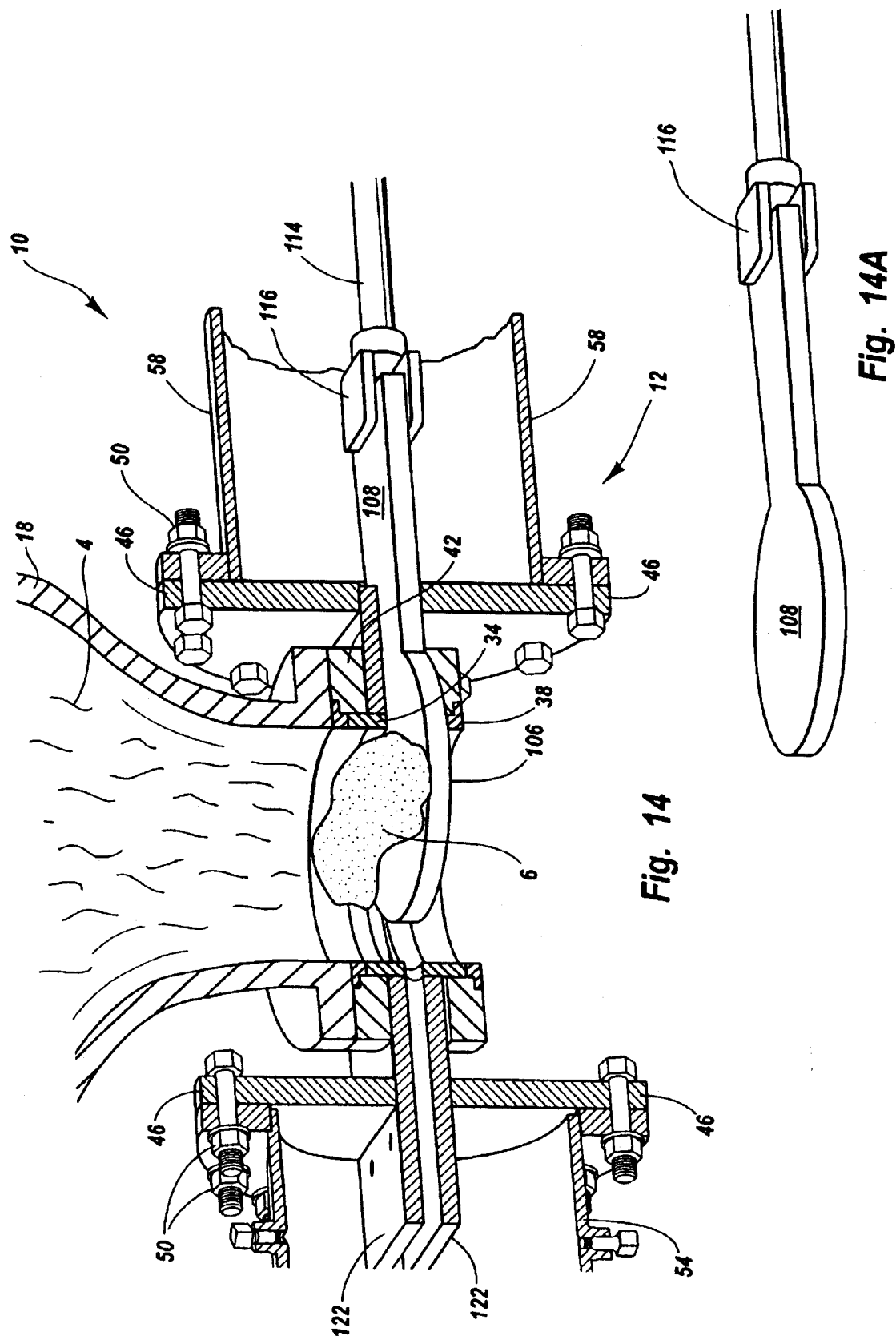
Figure 15:
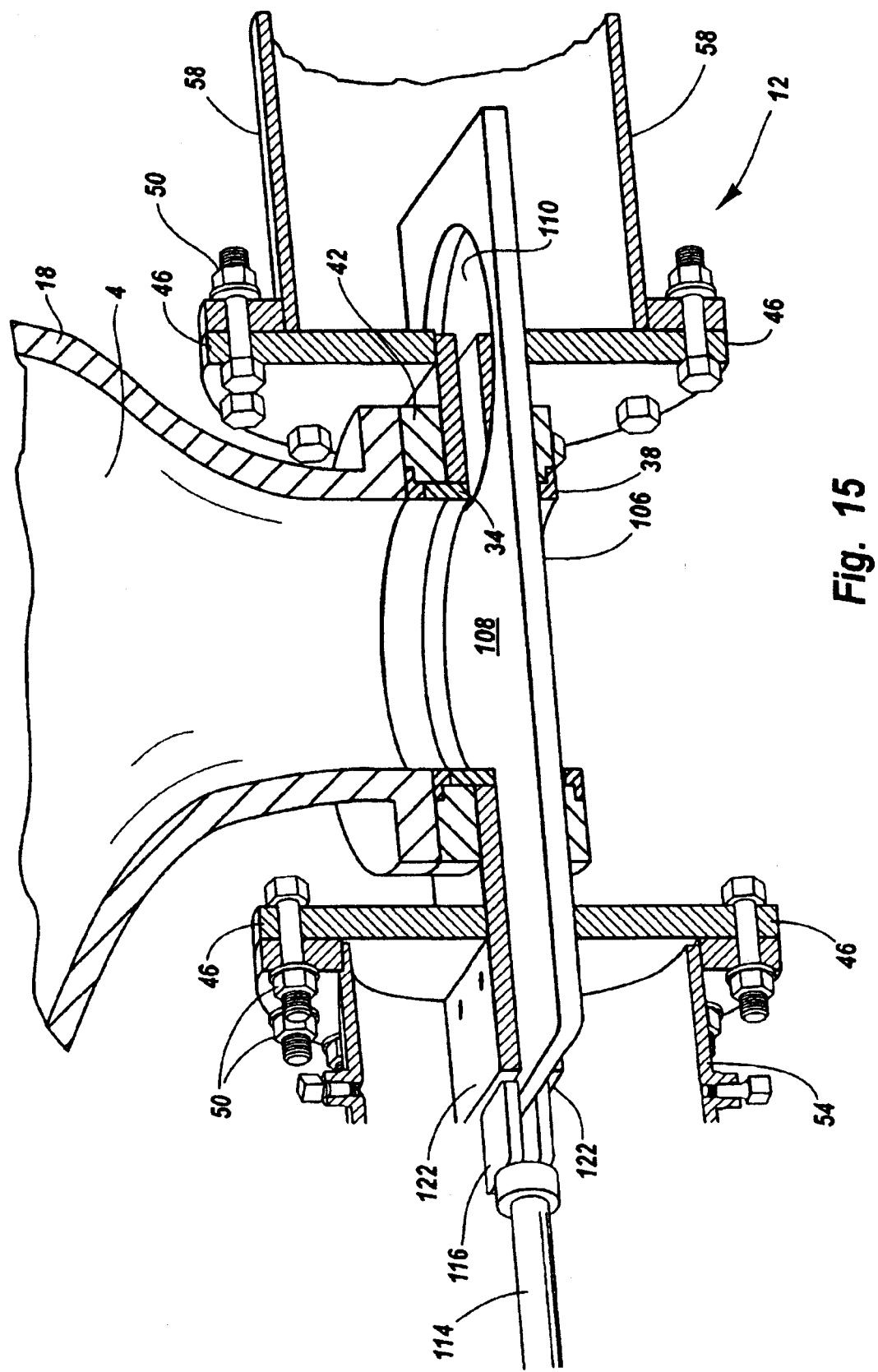
FIG. 15 illustrates a schematic of an actuator that provides lateral force to two de-heading assemblies at the same time such that when one de-heading sytem is closed, the other is open.

The present invention also contemplates different configuration of blind 106. For example, blind 106 could be configured as shown in FIGS. 12–14, or FIG. 13. In either embodiment, the opening and closing of drum 18 are still provided. In FIG. 12, blind 106 is simply shorter and lacks any opening 110. In FIG. 13, blind 106 comprises a recessed end. In FIG. 14, blind 106 comprises a rounded end. Alternatively, blind 106 could be rounded as shown in FIG. 14a.

The present invention also contemplates employing an actuator 62 that provides lateral force to two de-heading assemblies at the same time such that when one de-heading system is closes, the other is open, is illustrated schematically in FIG. 16.

The present invention may be embodied in other specific forms without departing from its spirit of essential characteristics. The described embodiments are to be considered in all respects only al illustrative and not restrictive. The scope of the invention is, therefore, indicated by the appended claims, rather than by the foregoing description. All changes which come within the meaning and range of equivalency of the claims are to be embraced within their scope

What is claimed is:

1. A coke drum de-heading system comprising:
   a coke drum having a flanged orifice;
   a de-header valve removably coupled to said flanged orifice of said coke drum and comprising:
   a first seat;
   a second seat aligned in opposition to said first seat; and
   a blind actuated by an actuator, said blind capable of moving in a bi-directional manner within said de-header valve between said first seat and said second seat to control the opening and closing of said de-header valve and to shear said coke from said blind when said blind is caked with coke.

2. The coke drum de-heading system of claim 1, further comprising means for monitoring and controlling the pressure existing within said de-heading system.

3. The coke drum de-heading system of claim 1, further comprising metal to metal seating such that there is a metal to metal contact seal between said first seat, said second seat, and said blind.

4. The coke drum de-heading system of claim 1, wherein said blind is a biased, dual seated blind.

5. The coke drum de-heading system of claim 1, wherein said system is a bottom de-heading system.

6. The coke drum de-heading system of claim 1, wherein said system is a top de-heading system.

7. The coke drum de-heading system of claim 1, wherein said de-header valve further comprises a main body having an orifice dimensioned to align, in a concentric relationship, with an orifice in said coke drum.

8. The coke drum de-heading system of claim 1, further comprising an upper and lower bonnet coupled to opposing ends of said de-header valve.

9. The coke drum de-heading system of claim 1, wherein at least one of said seats is a dynamic live loaded seat assembly further comprising a force transfer module in juxtaposition to said dynamic, live loaded seat for transferring a force from said live loaded seat adjustment mechanism to said dynamic, live loaded seat.

10. The coke drum de-heading system of claim 9, wherein said live loaded seat adjustment mechanism is comprised of:
    a force applicator having a portion thereof outside said de-header valve, such that an individual may adjust the force exerted on said blind by said dynamic, live loaded seat;
    a biased plunger coupled to said force applicator and applying a force from said force applicator to said force transfer module;
    a spring loaded assembly coupled to said pressure applicator and biasing said biased plunger; and
    a plurality of sealing members contained within said live loaded seat adjustment mechanism,
    wherein said force applicator applies a force to said force transfer module via said plunger, which subsequently forces said dynamic, live loaded seat against said blind, thus creating a seal between said blind and said seats.

11. The coke drum de-heading system of claim 1, wherein said actuator of said blind is controlled from a remote location to increase safety.

12. The coke drum de-heading system of claim 1, wherein said actuator of said blind is hydraulically controlled.

13. The coke drum de-heading system of claim 1, wherein at least one seat comprises a dynamic live loaded seat assembly comprising a plurality of dynamic, live loaded seats with corresponding live loaded seat adjustment mechanisms and opposing static seats, such that point to point adjustability and fine tuning of said live loaded seat assembly, as acting on said blind, is achieved.

14. A coke drum bottom de-heading system comprising:
    at least one coke drum containing manufactured coke therein, said at least one coke drum having a flanged bottom orifice;
    a de-header valve removably coupled to said coke drum to facilitate the removal of said coke from said at least one coke drum by de-heading said at least one coke drum, said de-header valve comprising:
        a main body having an flanged orifice therein for removably coupling said de-header valve to said flanged bottom orifice of said coke drum;
        an upper and lower bonnet coupled to said main body;
        a first seat coupled to said main body;
        a second seat coupled to said main body in opposition to said first seat; and
        a blind coupled to said main body and actuated by an actuator, said blind capable of moving in a bi-directional manner within said de-header valve between said first seat and said second seat to control the opening and closing of said de-header valve, said blind providing a seal between said first loaded seat and said second seat;
    said coke drum is de-headed, thus preparing said coke drum for the removal of said coke, by actuating said blind from a closed, sealed position, to an open position thereby causing said coke that has accumulated on said blind and within said valve to be sheared from said blind.

15. The bottom de-heading system of claim 14, further comprising means for monitoring and controlling the pressure existing within said de-heading system.

16. A coke drum top de-heading system comprising:
    means for monitoring and controlling pressure existing within said de-heading system; at least one coke drum containing manufactured coke therein, said at least one coke drum having a flanged top orifice;
    a de-header valve removably coupled to said coke drum to facilitate the removal of said coke from said at least one coke drum by de-heading said at least one coke drum, said de-header valve comprising:
        a main body having a flanged orifice therein for removably coupling said de-header valve to said flanged top orifice of said coke drum;
        an upper and lower bonnet coupled to said main body;
        a first seat coupled to said main body;
        a second seat coupled to said main body in opposition to said first seat; and
        a blind coupled to said main body and actuated by an actuator, said blind capable of moving in a bi-directional manner within said de-header valve between said first seat and second seat to control the opening and closing of said de-header valve, said blind providing a seal between said first seat and said second seat;
    said coke drum is de-headed, thus preparing said coke drum for the removal of said coke, by actuating said blind from a closed, sealed position, to an open position thereby causing said coke that has accumulated on said blind and within said valve to be sheared from said blind.

17. The top de-heading system of claim 16, further comprising means for monitoring and controlling the pressure existing within said de-heading system.

18. A coke drum de-heading system comprising:
   at least one coke drum containing manufactured coke therein, said at least one coke drum having a top orifice and a bottom orifice;
   a de-header valve removably coupled to said coke drum and designed to facilitate the removal of said coke from said at least one coke drum by de-heading said coke drum and allowing said coke to pass therethrough, said de-header valve comprising:
      a main body having an orifice dimensioned to align, in a concentric relationship, with either of said top and bottom orifices of said coke drum when said de-header valve is coupled thereto;
      a seat assembly coupled to said main body and comprising a first seat;
      a second seat positioned opposite from and counteracting said first seat; and
      a blind capable moving in a bi-directional manner within said de-header valve and between said first seat and said second seat, said blind physically controlled by an actuator; and
      such that a seal is created between said first seat, said blind, and said second seat;
   wherein said de-header valve de-heads said coke drum and facilitates the removal of said coke from said coke drum upon actuation of said blind from a closed to an open position wherein said coke is sheared.

19. The coke drum de-heading system of claim 18, wherein said coke drum de-heading system is a bottom de-heading system.

20. The coke drum de-heading system of claim 18, wherein said coke drum de-heading system is a top de-heading system.

21. The coke drum de-heading system of claim 18, wherein said coke drum has a flanged portion around either of said bottom and top orifices, and wherein said de-header valve has a flanged portion around said orifice of said main body, and wherein said flanged portion of said coke drum may be aligned and fit with said flanged portion of said de-header valve to provide a means for removably coupling said de-header valve to said coke drum.

22. The coke drum de-heading system of claim 18, wherein at least one of said seats comprises a dynamic, live loaded seat having a live loaded seat adjustment mechanism coupled to said main body and designed to control and adjust the force and resulting seat load of said dynamic, live loaded seat, and a force transfer module in juxtaposition to said dynamic, live loaded seat for transferring the force from said live loaded seat adjustment mechanism to said dynamic, live loaded seat; said dynamic, live loaded seat comprises an upper seat of said de-header valve.

23. The coke drum de-heading system of claim 22, wherein said dynamic, live loaded seat comprises an upper seat of said de-header valve.

24. The coke drum de-heading system of claim 22, wherein said live loaded seat assembly further comprises a seat retainer.

25. The coke drum de-heading system of claim 22, wherein said force transfer module is a wedge shaped member, such that an axial force introduced by said live loaded seat adjustment mechanism results in a substantially perpendicular force on said dynamic, live loaded seat.

26. The coke drum de-heading system of claim 22, wherein said live loaded seat adjustment mechanism is comprised of:
   a force applicator having a portion thereof outside said main body, such that an individual may adjust the force exerted on said blind by said dynamic, live loaded seat;
   a plunger coupled to said force applicator and applying a force from said force applicator to said force transfer module;
   a spring loaded assembly coupled to said pressure applicator and biasing said plunger; and
   a plurality of sealing members contained within said live loaded seat adjustment mechanism,
   wherein said force applicator applies a force to said force transfer module via said plunger, which subsequently forces said dynamic, live loaded seat against said blind, thus creating a seal between said blind and said seats.

27. The coke drum de-heading system of claim 18, wherein at least one of said seats is a static seat.

28. The coke drum de-heading system of claim 27, wherein said static seat comprises an upper seat of said de-header valve.

29. The coke drum de-heading system of claim 18, wherein said actuator of said blind is controlled from a remote location to increase safety.

30. The coke drum de-heading system of claim 18, wherein said actuator of said blind is hydraulically controlled.

31. The coke drum de-heading system of claim 18, wherein said actuator of said blind is pneumatically controlled.

32. The coke drum de-heading system of claim 18, further comprising means for monitoring and controlling the pressure existing within said de-heading system.

33. A method for de-heading a coke drum following the manufacture of coke therein, said method comprising the steps of:
   obtaining at least one coke drum designed for the manufacture of said coke; equipping
   said coke drum with a de-header valve, said de-header valve removably coupled to said coke drum and comprising: a main body having means for connecting said de-header valve to said coke drum; a first seat live loaded seat coupled to said main body; a second seat static seat coupled to said main body in opposition to said first seat; and a blind coupled to said main body and actuated by an actuator, said blind capable of moving in a substantially lateral bi-directional manner within said de-header valve between said first and second seats-dynamic, live loaded and static seats to control the opening and closing of said de-header valve, said blend providing a seal between said first seat and said second seat dynamic, live loaded and static seats
   closing said blind and sealing said dynamic, live loaded seat against said blind so as to seal said de-header valve;
   manufacturing said coke from a refinery process; and
   de-heading said coke drum by actuating said blind and causing said blind to slide across said dynamic, live loaded seat and said static seat into an open position, said dynamic, live loaded seat and said static seat thus shearing said coke in said coke drum as said blind is displaced.

34. The method of claim 33, wherein said de-heading comprises top de-heading of said coke drum.

35. The method of claim 33, wherein said de-heading comprises bottom de-heading of said coke drum.

36. A coke drum de-heading valve attachable to a coke drum, said coke drum de-heading valve comprising:
   a main body having an orifice dimensioned to fit and align with an orifice on a coke drum;

a live loaded seat assembly comprising a first seat;

a second seat aligned with and positioned opposite said first seat;

a blind controlled by an actuator and slidably contained between said first seat and said second seat, such that a seal is created between said blind and said seats, said blind capable of moving in a substantially lateral bi-directional manner between an open, partially open, and closed position, said blind shearing said coke when said blind is caked with coke as said blind is opened, thus de-heading said coke drum.

37. A coke drum de-heading valve of claim 36, wherever at least one of said seats comprises a dynamic, live loaded seat comprising an adjustment mechanism for controlling the amount of exertable force of said dynamic, live loaded seat.

* * * * *

UNITED STATES PATENT AND TRADEMARK OFFICE
CERTIFICATE OF CORRECTION

PATENT NO.    : 6,964,727 B2
DATED         : May 20, 2003
INVENTOR(S)   : Ruben F. Lah It is certified that error appears in the above-identified patent and that said Letters Patent is hereby corrected as shown below:

Column 20,
Lines 37-40, change "a frist seat dynamic, live loaded seat coupled to said main body; a second seat static seat coupled to said main body in opposition to said first seat;" to
-- a dynamic, live loaded seat coupled to said main body; a static seat coupled to said main body in opposition to said first seat; --
Lines 44-49, change "said first and second seats dynamic, live loaded and static seats to control the opening and; closing of said de-header valve, said blind providing a seal between said first and second seat dynamic, live loaded and static seats;" to -- said dynamic, live loaded and static seats to control the opening and; closing of said de-header valve, said blind providing a seal between said dynamic, live loaded and static seats; --.

Signed and Sealed this

Twenty-first Day of March, 2006

JON W. DUDAS
*Director of the United States Patent and Trademark Office*

UNITED STATES PATENT AND TRADEMARK OFFICE
CERTIFICATE OF CORRECTION

PATENT NO. : 6,964,727 B2  Page 1 of 1
DATED : November 15, 2005
INVENTOR(S) : Ruben F. Lah It is certified that error appears in the above-identified patent and that said Letters Patent is hereby corrected as shown below:

Column 20,
Lines 37-40, change "a frist seat dynamic, live loaded seat coupled to said main body; a second seat static seat coupled to said main body in opposition to said first seat;" to -- a dynamic, live loaded seat coupled to said main body; a static seat coupled to said main body in opposition to said first seat; --.
Lines 44-49, change "said first and second seats dynamic, live loaded and static seats to control the opening and; closing of said de-header valve, said blind providing a seal between said first and second seat dynamic, live loaded and static seats;" to -- said dynamic, live loaded and static seats to control the opening and; closing of said de-header valve, said blind providing a seal between said dynamic, live loaded and static seats; --.

This certificate supersedes Certificate of Correction issued March 21, 2006.

Signed and Sealed this

Second Day of May, 2006

JON W. DUDAS
*Director of the United States Patent and Trademark Office*

(12) EX PARTE REEXAMINATION CERTIFICATE (6992nd)
United States Patent
Lah

(10) Number: US 6,964,727 C1
(45) Certificate Issued: *Aug. 11, 2009

(54) COKE DRUM BOTTOM DE-HEADING SYSTEM

(75) Inventor: Ruben F. Lah, West Jordan, UT (US)

(73) Assignee: Curtiss-Wright Flow Control Corporation, Roseland, NJ (US)

Reexamination Request:
No. 90/008,209, Oct. 13, 2006

Reexamination Certificate for:
Patent No.: 6,964,727
Issued: Nov. 15, 2005
Appl. No.: 10/442,673
Filed: May 20, 2003

(*) Notice: This patent is subject to a terminal disclaimer.

Certificate of Correction issued Mar. 21, 2006.

Certificate of Correction issued May 2, 2006.

Related U.S. Application Data

(63) Continuation-in-part of application No. 09/946,917, filed on Sep. 5, 2001, now Pat. No. 6,565,714.
(60) Provisional application No. 60/275,527, filed on Mar. 12, 2001.

(51) Int. Cl.
*C10B 25/10* (2006.01)
*C10B 25/00* (2006.01)
*F16K 3/02* (2006.01)
*F16K 3/20* (2006.01)

(52) U.S. Cl. .................. 202/244; 202/242; 202/245; 202/252; 202/262; 49/149; 49/152; 49/453

(58) Field of Classification Search .................. None
See application file for complete search history.

(56) References Cited

U.S. PATENT DOCUMENTS 900,206 A 10/1908 Reed
2,245,554 A 6/1941 Court
2,717,865 A 9/1955 Kimberlin, Jr. et al.

(Continued)

OTHER PUBLICATIONS

Catalog, Velan Valve Corporation, 1980.
Hazards of Delayed Coker Unit (DCU) Operations, Chemical Emergency Preparedness and Prevention Office, Aug. 2003, pp. 1–8.
Seminar Materials, "3rd Annual Universal Delayed Coking Seminar," held Oct. 26–28, 1998 in Santa Monica, California, 45 pages.
Seminar Materials, "Delayed Coking Process Technology," presented by Refining Process Services, Inc. Apr. 20–22, 1999 in Houston, Texas, 89 pages.

*Primary Examiner*—Terrence R Till

(57) ABSTRACT

The present invention features a coke drum de-heading system comprising (a) at least one coke drum having an orifice therein; (b) a de-header valve removably coupled to the coke drum designed to de-head the coke drum; and (c) an exchange system, including an upper and lower bonnet and other elements and members adapted to integrate the de-heading system, and particularly the de-header valve, into the manufacturing system. The de-header valve itself comprises (1) a main body having an orifice dimensioned to align with and couple to, in a concentric relationship, the orifice of the coke drum; (2) a live loaded seat assembly coupled to the main body and comprising a dynamic, live loaded seat, a live seat adjustment mechanism coupled to the main body and designed to control and adjust the force and resulting seat load of the dynamic, live loaded seat, and a force transfer module in juxtaposition to the dynamic, live loaded seat for transferring the force from the live loaded seat adjustment mechanism to the dynamic, live loaded seat; (3) a static seat positioned opposite from and counteracting or counterbalancing the dynamic, live loaded seat; and (4) a blind or sliding blind capable moving in a linear, bi-directional manner within the de-header valve and between the dynamic, live loaded seat and the static seat, such that upon actuation of the blind from a closed position to an open position, the coke drum is de-headed.

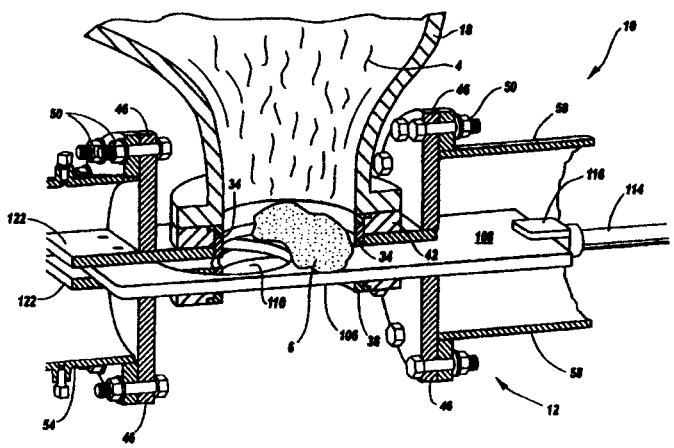

U.S. PATENT DOCUMENTS

| | | |
|---|---|---|
| 3,617,480 A | 11/1971 | Keel |
| 3,716,310 A | 2/1973 | Guenther |
| 3,837,356 A | 9/1974 | Selep et al. |
| 3,852,047 A | 12/1974 | Schlinger et al. |
| 4,125,438 A | 11/1978 | Kelly et al. |
| 4,253,487 A | 3/1981 | Worley |
| 4,275,842 A | 6/1981 | Purton et al. |
| 4,492,103 A | 1/1985 | Naumann |
| 4,531,539 A | 7/1985 | Jandrasi et al. |
| 4,666,585 A | 5/1987 | Figgins et al. |
| 4,726,109 A | 2/1988 | Malsbury et al. |
| 4,738,399 A | 4/1988 | Adams |
| 4,797,197 A | 1/1989 | Mallari |
| 4,929,339 A | 5/1990 | Elliott, Jr. et al. |
| 5,024,730 A | 6/1991 | Colvert |
| 5,035,221 A | 7/1991 | Martin |
| 5,041,207 A | 8/1991 | Harrington |
| 5,116,022 A | 5/1992 | Genreith et al. |
| 5,221,019 A | 6/1993 | Pechacek et al. |
| 5,228,525 A | 7/1993 | Denney et al. |
| 5,417,811 A | 5/1995 | Malsbury |
| 5,464,035 A | 11/1995 | Heinecke |
| 5,581,864 A | 12/1996 | Rabet |
| 5,816,787 A | 10/1998 | Brinkerhoff et al. |
| 5,927,684 A | 7/1999 | Marx et al. |
| 5,947,674 A | 9/1999 | Malsbury et al. |
| 6,117,308 A | 9/2000 | Ganji |
| 6,601,552 B2 | 8/2003 | Kubel et al. |
| 6,644,436 B2 | 11/2003 | Hofmann et al. |
| 6,751,852 B2 | 6/2004 | Malsbury et al. |
| 6,935,371 B2 | 8/2005 | Stares |
| 6,960,329 B2 | 11/2005 | Sellakumar |
| 7,037,408 B2 | 5/2006 | Wilborn |
| 2003/0089589 A1 | 5/2003 | Malsbury |
| 2003/0127314 A1 | 7/2003 | Bell et al. |

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–32 and 37 are cancelled.

Claims 33 and 36 are determined to be patentable as amended.

Claims 34 and 35, dependent on an amended claim, are determined to be patentable.

33. A method for de-heading a coke drum following the manufacture of coke therein, said method comprising the steps of:
  obtaining at least one coke drum designed for the manufacture of coke;
  equipping
  said coke drum with a de-header valve, said de-header valve removably coupled to said coke drum and comprising:
  a main body having means for connecting said de-header valve to said coke drum; a dynamic, live loaded seat coupled to said main body;
  a static seat coupled to said main body in opposition to said [first seat] *dynamic, live loaded seat*; [and]
  a blind coupled to said main body and actuated by an actuator, said blind capable of moving in a substantially lateral bi-directional manner within said de-header valve between said dynamic, live loaded *seat* and *said* static [seats] *seat* to control the opening and closing of said de-header valve, said blind providing a seal between said dynamic, live loaded *seat* and *said* static [seats] *seat*;
  closing said blind and sealing said dynamic, live loaded seat against said blind so as to seal said de-header valve;
  manufacturing said coke from a refinery process; and
  de-heading said coke drum by actuating said blind and causing said blind to slide across said dynamic, live loaded seat and said static seat into an open position, said dynamic, live loaded seat and said static seat thus shearing said coke in said coke drum as said blind is displaced.

36. A coke drum de-heading valve attachable to a coke drum, said coke drum de-heading valve comprising:
  a main body having an orifice dimensioned to fit and align with an orifice on [a] *said* coke drum;
  a live loaded seat assembly comprising:
   a first seat;
   a second seat aligned with and positioned opposite said first seat; *and*
  a blind controlled by an actuator and slidably contained between said first seat and said second seat, such that a seal is created between said blind and said seats, said blind capable of moving in a substantially lateral bi-directional manner between an open, partially open, and closed position, said blind shearing coke when said blind is caked with coke as said blind is opened, thus de-heading said coke drum.

* * * * *